US012676964B2

(12) United States Patent
Chiang et al.

(10) Patent No.: US 12,676,964 B2
(45) Date of Patent: Jul. 7, 2026

(54) METHOD AND APPARATUS FOR BLENDING PREDICTION IN VIDEO CODING SYSTEM

(71) Applicant: MEDIATEK INC., Hsinchu City (TW)

(72) Inventors: Man-Shu Chiang, Hsinchu City (TW); Chih-Wei Hsu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/858,509

(22) PCT Filed: Apr. 17, 2023

(86) PCT No.: PCT/CN2023/088598
§ 371 (c)(1),
(2) Date: Oct. 21, 2024

(87) PCT Pub. No.: WO2023/207646
PCT Pub. Date: Nov. 2, 2023

(65) Prior Publication Data
US 2025/0280107 A1 Sep. 4, 2025

Related U.S. Application Data

(60) Provisional application No. 63/334,327, filed on Apr. 25, 2022.

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11); *H04N 19/52* (2014.11)

(58) Field of Classification Search
None
See application file for complete search history.

(56) References Cited

U.S. PATENT DOCUMENTS

| | | | |
|---|---|---|---|
| 11,570,434 B2 | 1/2023 | Reuze | |
| 11,800,107 B2 | 10/2023 | Liao | |

(Continued)

FOREIGN PATENT DOCUMENTS

| | | |
|---|---|---|
| CN | 113473133 A | 10/2021 |
| CN | 113994701 A | 1/2022 |
| CN | 114342373 A | 4/2022 |

OTHER PUBLICATIONS

Gao, H. et al., "Non-EE2: Adaptive Blending for GPM", Input document to JVET, Joint Video Experts Team (JVET) of ITU-T SG 16 WP 3 and ISO/IEC JTC 1/SC 29, 26th Meeting, by teleconference Apr. 20-29, 2022, Document: JVET-Z0137-v1 (Apr. 13, 2022) (Year: 2022).*

(Continued)

*Primary Examiner* — Lindsay J Uhl
(74) *Attorney, Agent, or Firm* — McClure, Qualey & Rodack, LLP

(57) ABSTRACT

A method and apparatus for video coding. A current block is partitioned into a first region and a second region along a partition line. A blending region around the partition line is determined, where the blending region includes a first blending region having first pixels in the first region defined by the partition line and distance_1 and a second blending region having second pixels in the second region defined by the partition line and distance_2. The distance_1 and the distance_2 correspond to two non-negative values and can be different. A first predictor and a second predictor are determined for the first region and the second region respectively. A blended predictor for the blending region are generated by blending the first predictor and the second predictor. The current block is encoded or decoded by using prediction data comprising the blended predictor.

16 Claims, 15 Drawing Sheets

(51) Int. Cl.
    *H04N 19/176*        (2014.01)
    *H04N 19/52*         (2014.01)

(56)                References Cited

U.S. PATENT DOCUMENTS

| 12,388,993 | B2 * | 8/2025 | Lee | ........................ | H04N 19/96 |
| 2021/0227206 | A1 | 7/2021 | Chiu | | |
| 2023/0345023 | A1 * | 10/2023 | Chen | ...................... | H04N 19/44 |
| 2024/0031560 | A1 * | 1/2024 | Chen | ...................... | H04N 19/11 |
| 2025/0039457 | A1 * | 1/2025 | Gao | ........................ | H04N 19/70 |

OTHER PUBLICATIONS

International Search Report and Written Opinion dated Jul. 24, 2023, issued in application No. PCT/CN2023/088598.
Ma, Y., et al.; "GPM merge list construction modification;" Joint Video Experts Team (JVET) of ITU-T SG 16 WP 3 and ISO/IEC JTC 1/SC 29/WG 11; Apr. 2020; pp. 1-5.

* cited by examiner

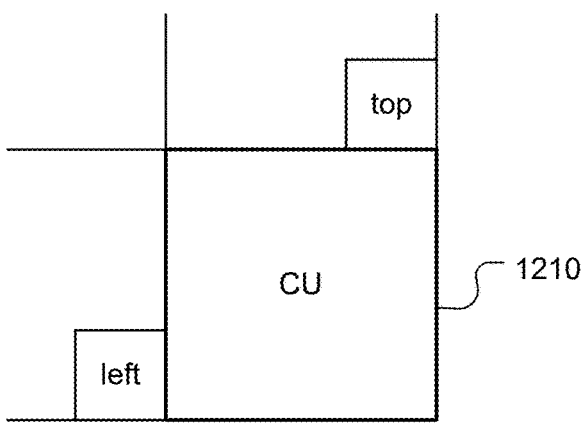
*Fig. 12*
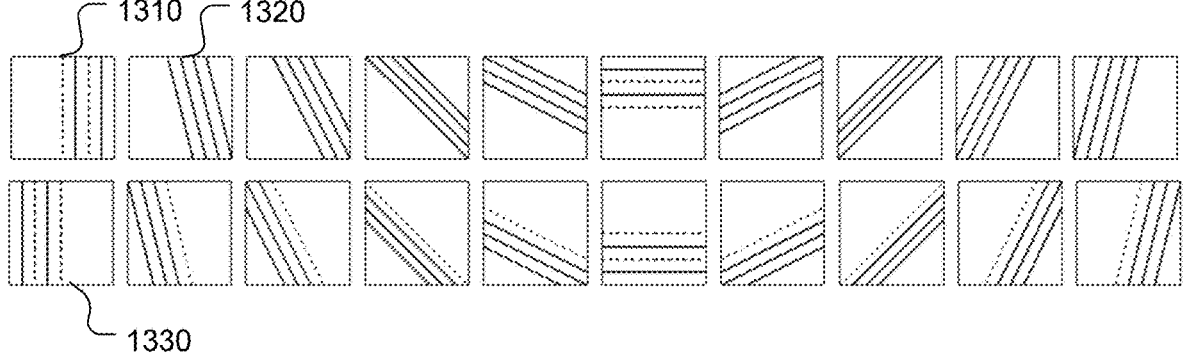
*Fig. 13*
| Merge Index | L0 MV | L1 MV |
|---|---|---|
| 0 | X | |
| 1 | | X |
| 2 | X | |
| 3 | | X |
| 4 | X | |
*Fig. 14*

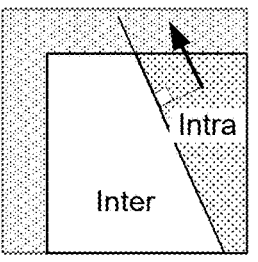
*Fig. 24A*
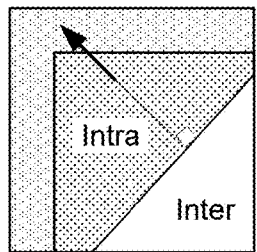
*Fig. 24B*
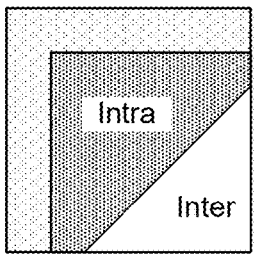
*Fig. 24C*
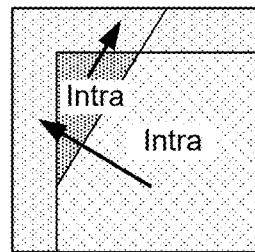
*Fig. 24D*
```
If( cu_sgpm_flag )
{
  partition_mode_idx
  intra_pred_mode0_idx
  intra_pred_mode1_idx
}
```
*Fig. 25A*
```
If( cu_sgpm_flag )
{
  sgpm_cand_idx
}
```
*Fig. 25B*
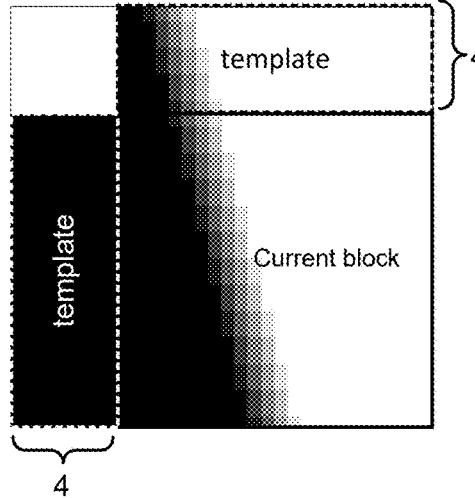
*Fig. 26*

METHOD AND APPARATUS FOR BLENDING PREDICTION IN VIDEO CODING SYSTEM

CROSS REFERENCE TO RELATED APPLICATIONS

The present invention is a non-Provisional application of and claims priority to U.S. Provisional Patent Application No. 63/334,327, filed on Apr. 25, 2022. The U.S. Provisional patent application is hereby incorporated by reference in its entirety.

FIELD OF THE INVENTION

The present invention relates to video coding system. In particular, the present invention relates to blending predictors using an adaptive blending region to improve coding efficiency.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Among various new coding tools, some coding tools relevant to the present invention are reviewed as follows.

Inter Prediction Overview

According to JVET-T2002 Section 3.4. (Jianle Chen, et. al., "Algorithm description for Versatile Video Coding and Test Model 11 (VTM 11)", Joint Video Experts Team (JVET) of ITU-T SG 16 WP 3 and ISO/IEC JTC 1/SC 29, 20th Meeting, by teleconference, 7-16 Oct. 2020, Document: JVET-T2002)), for each inter-predicted CU, motion parameters consist of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU, which are obtained from neighbouring CUs, including spatial and temporal candidates, and additional schedules introduced in VVC. The merge mode can be applied to any inter-predicted CU, not only for skip mode. The alternative to the merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of new and refined inter prediction coding tools listed as follows:

Extended merge prediction

Merge mode with MVD (MMVD)

Symmetric MVD (SMVD) signalling

Affine motion compensated prediction

Subblock-based temporal motion vector prediction (SbTMVP)

Adaptive motion vector resolution (AMVR)

Motion field storage: $\frac{1}{16}^{th}$ luma sample MV storage and 8×8 motion field compression Bi-prediction with CU-level weight (BCW)

Bi-directional optical flow (BDOF)

Decoder side motion vector refinement (DMVR)

Geometric partitioning mode (GPM)

Combined inter and intra prediction (CIIP)

The following description provides the details of those inter prediction methods specified in VVC.

Extended Merge Prediction

In VVC, the merge candidate list is constructed by including the following five types of candidates in order:

1) Spatial MVP from spatial neighbour CUs

2) Temporal MVP from collocated CUs

3) History-based MVP from an FIFO table

4) Pairwise average MVP

5) Zero MVs.

The size of merge list is signalled in sequence parameter set (SPS) header and the maximum allowed size of merge list is 6. For each CU coded in the merge mode, an index of best merge candidate is encoded using truncated unary binarization (TU). The first bin of the merge index is coded with context and bypass coding is used for remaining bins.

The derivation process of each category of the merge candidates is provided in this session. As done in HEVC, VVC also supports parallel derivation of the merge candidate lists (or called as merging candidate lists) for all CUs within a certain size of area.

Spatial Candidate Derivation

The derivation of spatial merge candidates in VVC is the same as that in HEVC except that the positions of first two merge candidates are swapped. A maximum of four merge candidates ($B_0$, $A_0$, $B_1$ and $A_1$) for current CU 210 are selected among candidates located in the positions depicted in FIG. 2. The order of derivation is $B_0$, $A_0$, $B_1$, $A_1$ and $B_2$. Position $B_2$ is considered only when one or more neighbouring CU of positions $B_0$, $A_0$, $B_1$, $A_1$ are not available (e.g. belonging to another slice or tile) or is intra coded. After candidate at position $A_1$ is added, the addition of the remaining candidates is subject to a redundancy check which ensures that candidates with the same motion information are excluded from the list so that coding efficiency is improved. To reduce computational complexity, not all possible candidate pairs are considered in the mentioned redundancy check. Instead, only the pairs linked with an arrow in FIG. 3 are considered and a candidate is only added to the list if the corresponding candidate used for redundancy check does not have the same motion information.

Temporal Candidates Derivation

In this step, only one candidate is added to the list. Particularly, in the derivation of this temporal merge candidate for a current CU 410, a scaled motion vector is derived based on the co-located CU 420 belonging to the collocated reference picture as shown in FIG. 4. The reference picture list and the reference index to be used for the derivation of the co-located CU is explicitly signalled in the slice header. The scaled motion vector 430 for the temporal merge candidate is obtained as illustrated by the dotted line in FIG. 4, which is scaled from the motion vector 440 of the co-located CU using the POC (Picture Order Count) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

The position for the temporal candidate is selected between candidates $C_0$ and $C_1$, as depicted in FIG. 5. If CU at position $C_0$ is not available, is intra coded, or is outside of the current row of CTUs, position $C_1$ is used. Otherwise, position $C_0$ is used in the derivation of the temporal merge candidate.

History-Based Merge Candidates Derivation

The history-based MVP (HMVP) merge candidates are added to the merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 5 History-based MVP (HMVP) candidates may be added to the table. When inserting a new motion candidate to the table, a constrained first-in-first-out (FIFO) rule is utilized where redundancy check is firstly applied to find whether there is an identical HMVP in the table. If found, the identical HMVP is removed from the table and all the HMVP candidates afterwards are moved forward, and the identical HMVP is inserted to the last entry of the table.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy, check operations, the following simplifications are introduced:

1. The last two entries in the table are checked for redundancy with respect to $A_1$ and $B_1$ spatial candidates, respectively.

2. Once the total number of available merge candidates reaches the maximally allowed merge candidates minus 1, the merge candidate list construction process from HMVP is terminated.

Pair-Wise Average Merge Candidates Derivation

Pairwise average candidates are generated by averaging predefined pairs of candidates in the existing merge candidate list, using the first two merge candidates. The first merge candidate is defined as p0Cand and the second merge candidate can be defined as p1Cand, respectively. The averaged motion vectors are calculated according to the availability of the motion vector of p0Cand and p1Cand separately for each reference list. If both motion vectors are available in one list, these two motion vectors are averaged even when they point to different reference pictures, and its reference picture is set to the one of p0Cand; if only one motion vector is available, use the one directly; and if no motion vector is available, keep this list invalid. Also, if the half-pel interpolation filter indices of p0Cand and p1Cand are different, it is set to 0.

When the merge list is not full after pair-wise average merge candidates are added, the zero MVPs are inserted in the end until the maximum merge candidate number is encountered.

Merge Estimation Region

Merge estimation region (MER) allows independent derivation of merge candidate list for the CUs in the same merge estimation region (MER). A candidate block that is within the same MER as the current CU is not included for the generation of the merge candidate list of the current CU. In addition, the updating process for the history-based motion vector predictor candidate list is updated only if (xCb+cbWidth)>>Log 2ParMrgLevel is greater than xCh>>Log 2ParMrgLevel and (yCb+cbHeight)>>Log 2ParMrgLevel is great than (yCb>>Log 2ParMrgLevel), and where (xCb, yCb) is the top-left luma sample position of the current CU in the picture and (cbWidth, cbHeight) is the CU size. The MER size is selected at the encoder side and signalled as log 2_parallel_merge_level_minus2 in the Sequence Parameter Set (SPS).

Merge Mode with MVD (MMVD)

In addition to the merge mode, where the implicitly derived motion information is directly used for prediction samples generation of the current CU, the merge mode with motion vector differences (MMVD) is introduced in VVC. A MMVD flag is signalled right after sending a regular merge flag to specify whether MMVD mode is used for a CU.

In MMVD, after a merge candidate is selected (referred as a base merge candidate in this disclosure), it is further refined by the signalled MVDs information. The further information includes a merge candidate flag, an index to specify motion magnitude, and an index for indication of motion direction. In MMVD mode, one for the first two candidates in the merge list is selected to be used as MV basis. The MMVD candidate flag is signalled to specify which one is used between the first and second merge candidates.

Distance index specifies motion magnitude information and indicates the pre-defined offset from the starting points (612 and 622) for a L0 reference block 610 and L1 reference block 620. As shown in FIG. 6 an offset is added to either horizontal component or vertical component of the starting MV, where small circles in different styles correspond to different offsets from the centre. The relation of distance index and pre-defined offset is specified in Table 1.

TABLE 1

| The relation of distance index and pre-defined offset | | | | | | | | |
|---|---|---|---|---|---|---|---|---|
| Distance IDX | 0 | 1 | 2 | 3 | 4 | 5 | 6 | 7 |
| Offset (in unit of luma sample) | $\frac{1}{4}$ | $\frac{1}{2}$ | 1 | 2 | 4 | 8 | 16 | 32 |

Direction index represents the direction of the MVD relative to the starting point. The direction index can represent the four directions as shown in Table 2. It is noted that the meaning of MVD sign could be variant according to the information of starting MVs. When the starting MVs are an un-prediction MV or bi-prediction MVs with both lists pointing to the same side of the current picture (i.e. POCs of two references both larger than the POC of the current picture, or both smaller than the POC of the current picture), the sign in Table 2 specifies the sign of the MV offset added to the starting MV. When the starting MVs are bi-prediction MVs with the two MVs pointing to the different sides of the current picture (i.e. the POC of one reference larger than the POC of the current picture, and the POC of the other reference smaller than the POC of the current picture), and the difference of POC in list 0 is greater than the one in list 1, the sign in Table 2 specifies the sign of MV offset added to the list0 MV component of the starting MV and the sign for the list1 MV has an opposite value. Otherwise, if the difference of POC in list 1 is greater than list 0, the sign in Table 2 specifies the sign of the MV offset added to the list 1 MV component of starting MV and the sign for the list0 MV has an opposite value.

The MVD is scaled according to the difference of POCs in each direction. If the differences of POCs in both lists are the same, no scaling is needed. Otherwise, if the difference of POC in list 0 is larger than the one in list 1, the MVD for list 1 is scaled, by defining the POC difference of L0 as td and POC difference of L1 as tb, described in FIG. 4. If the POC difference of L1 is greater than L0, the MVD for list 0 is scaled in the same way. If the starting MV is uni-predicted, the MVD is added to the available MV.

TABLE 2

| Sign of MV offset specified by direction index | | | | |
|---|---|---|---|---|
| Direction IDX | 00 | 01 | 10 | 11 |
| x-axis | + | − | N/A | N/A |
| y-axis | N/A | N/A | + | − |

Affine Motion Compensated Prediction

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. As shown FIGS. 7A-B, the affine motion field of the block 710 is described by motion information of two control point (4-parameter) in FIG. 7A or three control point motion vectors (6-parameter) in FIG. 7B.

For 4-parameter affine motion model, motion vector at sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad (1)$$

For 6-parameter affine motion model, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (2)$$

Where $(mv_{0x}, mv_{0y})$ is motion vector of the top-left corner control point, $(mv_{1x}, mv_{1y})$ is motion vector of the top-right corner control point, and $(mv_{2x}, mv_{2y})$ is motion vector of the bottom-left corner control point.

In order to simplify the motion compensation prediction, block based affine transform prediction is applied. To derive motion vector of each 4×4 luma subblock, the motion vector of the centre sample of each subblock, as shown in FIG. 8, is calculated according to above equations, and rounded to $\frac{1}{16}$ fraction accuracy. Then, the motion compensation interpolation filters are applied to generate the prediction of each subblock with the derived motion vector. The subblock size of chroma-components is also set to be 4×4. The MV of a 4×4 chroma subblock is calculated as the average of the MVs of the top-left and bottom-right luma subblocks in the collocated 8×8 luma region.

As is for translational-motion inter prediction, there are also two affine motion inter prediction modes: affine merge mode and affine AMVP mode.

Affine Merge Prediction

AF_MERGE mode can be applied for CUs with both width and height larger than or equal to 8. In this mode, the CPMVs (Control Point MVs) of the current CU is generated based on the motion information of the spatial neighbouring CUs. There can be up to five CPMVP (CPMV Prediction) candidates and an index is signalled to indicate the one to be used for the current CU. The following three types of CPVM candidate are used to form the affine merge candidate list:

Inherited affine merge candidates that are extrapolated from the CPMVs of the neighbour CUs Constructed affine merge candidates CPMVPs that are derived using the translational MVs of the neighbour CUs Zero MVs In VVC, there are two inherited affine candidates at most, which are derived from the affine motion model of the neighbouring blocks, one from left neighbouring CUs and one from above neighbouring CUs. The candidate blocks are the same as those shown in FIG. 2. For the left predictor, the scan order is $A_0 \rightarrow A_1$, and for the above predictor, the scan order is $B0 \rightarrow B_1 \rightarrow B_2$. Only the first inherited candidate from each side is selected. No pruning check is performed between two inherited candidates. When a neighbouring affine CU is identified, its control point motion vectors are used to derived the CPMVP candidate in the affine merge list of the current CU. As shown in FIG. 9, if the neighbouring left bottom block A of the current block 910 is coded in affine mode, the motion vectors $v_2$, $v_3$ and $v_4$ of the top left corner, above right corner and left bottom corner of the CU 920 containing block A are attained. When block A is coded with 4-parameter affine model, the two CPMVs of the current CU (i.e., $v_0$ and $v_1$) are calculated according to $v_2$, and $v_3$. In case that block A is coded with 6-parameter affine model, the three CPMVs of the current CU are calculated according to $v_2$, $v_3$ and $v_4$.

Constructed affine candidate means the candidate is constructed by combining the neighbouring translational motion information of each control point. The motion information for the control points is derived from the specified spatial neighbours and temporal neighbour for a current block 1010 as shown in FIG. 10. $\text{CPMV}_k$ (k=1, 2, 3, 4) represents the k-th control point. For $\text{CPMV}_1$, the B2→B3→A2 blocks are checked and the MV of the first available block is used. For $\text{CPMV}_2$, the B1→B0 blocks are checked and for $\text{CPMV}_3$, the A1→A0 blocks are checked. For TMVP is used as $\text{CPMV}_4$ if it's available.

After MVs of four control points are attained, affine merge candidates are constructed based on the motion information. The following combinations of control point MVs are used to construct in order:

$\{\text{CPMV}_1, \text{CPMV}_2, \text{CPMV}_3\}$, $\{\text{CPMV}_1, \text{CPMV}_2, \text{CPMV}_4\}$, $\{\text{CPMV}_1, \text{CPMV}_3, \text{CPMV}_4\}$, $\{\text{CPMV}_2, \text{CPMV}_3, \text{CPMV}_4\}$, $\{\text{CPMV}_1, \text{CPMV}_2\}$, $\{\text{CPMV}_1, \text{CPMV}_3\}$ The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

Affine AMVP Prediction

Affine AMVP mode can be applied for CUs with both width and height larger than or equal to 16. An affine flag in the CU level is signalled in the bitstream to indicate whether affine AMVP mode is used and then another flag is signalled to indicate whether 4-parameter affine or 6-parameter affine is used. In this mode, the difference of the CPMVs of current CU and their predictors CPMVPs is signalled in the bitstream. The affine AVMP candidate list size is 2 and it is generated by using the following four types of CPVM candidate in order:

Inherited affine AMVP candidates that extrapolated from the CPMVs of the neighbour CUs Constructed affine AMVP candidates CPMVPs that are derived using the translational MVs of the neighbour CUs Translational MVs from neighbouring CUs Zero MVs The checking order of inherited affine AMVP candidates is the same as the checking order of inherited affine merge candidates. The only difference is that, for AVMP candidate, only the affine CU that has the same reference picture as current block is considered. No pruning process is applied when inserting an inherited affine motion predictor into the candidate list.

Constructed AMVP candidate is derived from the specified spatial neighbours shown in FIG. 10. The same checking order is used as that in the affine merge candidate construction. In addition, the reference picture index of the neighbouring block is also checked. In the checking order, the first block that is inter coded and has the same reference picture as in current CUs is used. When the current CU is coded with the 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, the constructed AMVP candidate is set as unavailable.

If the number of affine AMVP list candidates is still less than 2 after valid inherited affine AMVP candidates and constructed AMVP candidate are inserted, $mv_0$, $mv_1$ and $mv_2$ will be added as the translational MVs in order to predict all control point MVs of the current CU, when available. Finally, zero MVs are used to fill the affine AMVP list if it is still not full.

Affine Motion Information Storage

In VVC, the CPMVs of affine CUs are stored in a separate buffer. The stored CPMVs are only used to generate the inherited CPMVPs in the affine merge mode and affine AMVP mode for the lately coded CUs. The subblock MVs derived from CPMVs are used for motion compensation, MV derivation of merge/AMVP list of translational MVs and de-blocking.

To avoid the picture line buffer for the additional CPMVs, affine motion data inheritance from the CUs of the above CTU is treated differently for the inheritance from the normal neighbouring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in a local buffer. If the candidate CU is 6-parameter affine coded, the affine model is degraded to 4-parameter model. As shown in FIG. 11, along the top CTU boundary, the bottom-left and bottom right subblock motion vectors of a CU are used for affine inheritance of the CUs in bottom CTUs. In FIG. 11, line 1110 and line 1112 indicate the x and y coordinates of the picture with the origin (0,0) at the upper left corner. Legend 1120 shows the meaning of various motion vectors, where arrow 1122 represents the CPMVs for affine inheritance in the local buff, arrow 1124 represents sub-block vectors for MC/merge/skip/AMVP/deblocking/TMVPs in the local buffer and for affine inheritance in the line buffer, and arrow 1126 represents sub-block vectors for MC/merge/skip/AMVP/deblocking/TMVPs.

Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precisions. Dependent on the mode (normal AMVP mode or affine AVMP mode) for the current CU, the MVDs of the current CU can be adaptively selected as follows:

Normal AMVP mode: quarter-luma-sample, half-luma-sample, integer-luma-sample or four-luma-sample.

Affine AMVP mode: quarter-luma-sample, integer-luma-sample or $\frac{1}{16}$ luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signalling is needed and quarter-luma-sample MVD precision is used for the current CU. Otherwise, a second flag is signalled to indicate half-luma-sample or other MVD precisions (integer or four-luma sample) is used for a normal AMVP CU. In the case of half-luma-sample, a 6-tap interpolation filter instead of the default 8-tap interpolation filter is used for the half-luma sample position. Otherwise, a third flag is signalled to indicate whether integer-luma-sample or four-luma-sample MVD precision is used for the normal AMVP CU. In the case of affine AMVP CU, the second flag is used to indicate whether integer-luma-sample or $\frac{1}{16}$ luma-sample MVD precision is used. In order to ensure the reconstructed MV has the intended precision (quarter-luma-sample, half-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing the CU-level RD check four times for each MVD resolution, the RD check of MVD precisions other than quarter-luma-sample is only invoked conditionally in VTM11. For the normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for the quarter-luma-sample MVD precision is much smaller than that of the integer-luma-sample MVD precision, the RD check of four-luma-sample MVD precision is skipped. Then, the check of half-luma-sample MVD precision is skipped if the RD cost of integer-luma-sample MVD precision is significantly larger than the best RD cost of previously tested MVD precisions. For the affine AMVP mode, if the affine inter mode is not selected after checking rate-distortion costs of affine merge/skip mode, merge/skip mode, quarter-luma-sample MVD precision normal AMVP mode and quarter-luma-sample MVD precision affine AMVP mode, then $\frac{1}{16}$ luma-sample MV precision and 1-pel MV precision affine inter modes are not checked. Furthermore, affine parameters obtained in quarter-luma-sample MV precision affine inter mode are used as starting search point in $\frac{1}{16}$ luma-sample and quarter-luma-sample MV precision affine inter modes.

Bi-Prediction with CU-Level Weight (BCW)

In HEVC, the bi-prediction signal, $P_{bi-pred}$ is generated by averaging two prediction signals, $P_0$ and $P_1$ obtained from two different reference pictures and/or using two different motion vectors. In VVC, the bi-prediction mode is extended beyond simple averaging to allow weighted averaging of the two prediction signals.

$$P_{bi-pred} = ((8 - w) * P_0 + w * P_1 + 4) \gg 3 \qquad (3)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used. At the encoder, fast search algorithms are applied to find the weight index without significantly increasing the encoder complexity. These algorithms are summarized as follows. The details are disclosed in the VTM software and document JVET-L0646 (Yu-Chi Su, et. al., "CE4-related: Generalized bi-prediction improvements combined from JVET-L0197 and JVET-L0296", Joint Video Experts Team (JVET) of ITU-T SG 16 WP 3 and ISO/IEC JTC 1/SC 29, 12th Meeting: Macao, CN, 3-12 Oct. 2018, Document: JVET-L0646).

When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP is also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and weight w is inferred to be 4 (i.e. equal weight is applied). For a merge CU, the weight index is inferred from neighbouring blocks based on the merge candidate index. This can be applied to both the normal merge mode and inherited affine merge mode. For the constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, (i.e., w=4 for equal weight). Equal weight implies the default value for the BCW index.

Combined Inter and Intra Prediction (CIIP)

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value wt is calculated depending on the coding modes of the top and left neighbouring blocks (as shown in FIG. 12) of current CU 1210 as follows:

If the top neighbour is available and intra coded, then set isIntraTop to 1, otherwise set isIntraTop to 0;

If the left neighbour is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CIIP prediction is formed as follows:

$$P_{CIIP} = ((4 - wt) * P_{inter} + wt * P_{intra} + 2) \gg 2 \qquad (4)$$

Geometric Partitioning Mode (GPM)

In VVC, a Geometric Partitioning Mode (GPM) is supported for inter prediction as described in JVET-W2002 (Adrian Browne, et al., Algorithm description for Versatile Video Coding and Test Model 14 (VTM 14), ITU-T/ISO/IEC Joint Video Exploration Team (JVET), 23rd Meeting, by teleconference, 7-16 Jul. 2021, document: document JVET-M2002). The geometric partitioning mode is signalled using a CU-level flag as one kind of merge mode, with other merge modes including the regular merge mode, the MMVD mode, the CIIP mode and the subblock merge mode. A total of 64 partitions are supported by geometric partitioning mode for each possible CU size, $w \times h = 2^m \times 2^n$ with m, $n \in \{3 \ldots 6\}$ excluding 8×64 and 64×8. The GPM mode can be applied to skip or merge CUs having a size within the above limit and having at least two regular merge modes.

When this mode is used, a CU is split into two parts by a geometrically located straight line in certain angles. In VVC, there are a total of 20 angles and 4 offset distances used for GPM, which has been reduced from 24 angles in an earlier draft. The location of the splitting line is mathematically derived from the angle and offset parameters of a specific partition. In VVC, there are a total of 64 partitions as shown in FIG. 13, where the partitions are grouped according to their angles and dashed lines indicate redundant partitions. Each part of a geometric partition in the CU is inter-predicted using its own motion; only uni-prediction is allowed for each partition, that is, each part has one motion vector and one reference index. In FIG. 13, each line corresponds to the boundary of one partition. The partitions are grouped according to its angle. For example, partition group 1310 consists of three vertical GPM partitions (i.e., 90°). Partition group 1320 consists of four slant GPM partitions with a small angle from the vertical direction. Also, partition group 1330 consists of three vertical GPM partitions (i.e., 270°) similar to those of group 1310, but with an opposite direction. The uni-prediction motion constraint is applied to ensure that only two motion compensated prediction are needed for each CU, same as the conventional bi-prediction. The uni-prediction motion for each partition is derived using the process described later.

If geometric partitioning mode is used for the current CU, then a geometric partition index indicating the selected partition mode of the geometric partition (angle and offset), and two merge indices (one for each partition) are further signalled. The number of maximum GPM candidate size is signalled explicitly in SPS (Sequence Parameter Set) and specifies syntax binarization for GPM merge indices. After predicting each of part of the geometric partition, the sample values along the geometric partition edge are adjusted using a blending processing with adaptive weights using the process described later. This is the prediction signal for the whole CU, and transform and quantization process will be applied to the whole CU as in other prediction modes. Finally, the motion field of a CU predicted using the geometric partition modes is stored using the process described later.

Uni-Prediction Candidate List Construction

The uni-prediction candidate list is derived directly from the merge candidate list constructed according to the extended merge prediction process. Denote n as the index of the uni-prediction motion in the geometric uni-prediction candidate list. The LX motion vector of the n-th extended merge candidate (X=0 or 1, i.e., LX=L0 or L1), with X equal to the parity of n, is used as the n-th uni-prediction motion vector for geometric partitioning mode. These motion vectors are marked with "x" in FIG. 14. In case a corresponding LX motion vector of the n-the extended merge candidate does not exist, the L(1−X) motion vector of the same candidate is used instead as the uni-prediction motion vector for geometric partitioning mode.

Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The two integer blending matrices ($W_0$ and $W_1$) are utilized for the GPM blending process. The weights in the GPM blending matrices contain the value range of [0, 8] and are derived based on the displacement from a sample position to the GPM partition boundary 1540 as shown in FIG. 15.

Specifically, the weights are given by a discrete ramp function with the displacement and two thresholds as shown in FIG. 16, where the two end points (i.e., $-\tau$ and $\tau$) of the ramp correspond to lines 1542 and 1544 in FIG. 15.

Here, the threshold t defines the width of the GPM blending area and is selected as the fixed value in VVC. In other words, as JVET-Z0137 (Han Gao, et. al., "Non-EE2: Adaptive Blending for GPM", Joint Video Experts Team (JVET) of ITU-T SG 16 WP 3 and ISO/IEC JTC 1/SC 29, 26th Meeting, by teleconference, 20-29 Apr. 2022, JVET-Z0137), the blending strength or blending area width $\theta$ is fixed for all different contents.

The weighing values in the blending mask can be given by a ramp function $$\omega_{x_c, y_c} = \begin{cases} 0 & d(x_c, y_c) \leq -\theta \\ \dfrac{8}{2\theta} \, (d(x_c, y_c) + \theta) & -\theta < d(x_c, y_c) < \theta \\ 8 & d(x_c, y_c) \geq \theta, \end{cases} \tag{5}$$

With a fixed $\theta=2$ pel in the current ECM (VVC) design, this ramp function can be quantized as:

$$\omega_{m,n} = \text{Clip3}(0, 8, (d(m, n) + 32 + 4) \gg 3) \tag{6}$$

The distance for a position (x, y) to the partition edge are derived as:

$$d(x, y) = (2x + 1 - w)\cos(\varphi_i) + (2y + 1 - h)\sin(\varphi_i) - \rho_j \tag{7}$$

$$\rho_j = \rho_{x,j}\cos(\varphi_i) + \rho_{y,j}\sin(\varphi_i) \tag{8}$$

$$\rho_{x,j} = \begin{cases} 0 & i \% 16 = 8 \text{ or } (i \% 16 \neq 0 \text{ and } h \geq w) \\ \pm(j \times w) \gg 2 & \text{otherwise} \end{cases} \tag{9}$$

-continued
$$\rho_{y,j} = \begin{cases} \pm(j \times h) \gg 2 & i \% 16 = 8 \text{ or } (i \% 16 \neq 0 \text{ and } h \geq w) \\ 0 & \text{otherwise} \end{cases} \tag{10}$$

where i, j are the indices for angle and offset of a geometric partition, which depend on the signaled geometric partition index. The sign of $\rho_{x,j}$ and $\rho_{y,j}$ depend on angle index i.

FIG. 17 illustrates an example of GPM blending according to ECM 4.0 (Muhammed Coban, et. al., "Algorithm description of Enhanced Compression Model 4 (ECM 4)", Joint Video Experts Team (JVET) of ITU-T SG 16 WP 3 and ISO/IEC JTC 1/SC 29, 26th Meeting, by teleconference, 20-29 Apr. 2022, JVET-Y2025). In FIG. 17, the size of the blending region on each side of the partition boundary is indicated by $\theta$. The weights for each part of a geometric partition are derived as following:

$$wIdxL(x, y) = partIdx \, ? \, 32 + d(x, y) : 32 - d(x, y) \tag{11}$$

$$w_0(x, y) = \dfrac{\text{Clip3}(0, 8, (wIdxL(x, y) + 4) \gg 3)}{8} \tag{12}$$

$$w_1(x, y) = 1 - w_0(x, y) \tag{13}$$

The partIdx depends on the angle index i. One example of weigh $w_0$ is illustrated in FIG. 15, where the angle $\varphi_i$ 1510 and offset $\rho_i$ 1520 are indicated for GPM index i and point 1530 corresponds to the center of the block. Line 1540 corresponds to the GPM partitioning boundary Motion Field Storage for Geometric Partitioning Mode Mv1 from the first part of the geometric partition, Mv2 from the second part of the geometric partition and a combined MV of Mv1 and Mv2 are stored in the motion filed of a geometric partitioning mode coded CU.

The stored motion vector type for each individual position in the motion filed are determined as:

$$sType = \tag{14}$$

$$\text{abs}(motionIdx) < 32 \, ? \, 2 : (motionIdx \leq 0 \, ?(1 - partIdx) : partIdx)$$

where motionIdx is equal to d (4x+2, 4y+2), which is recalculated from equation (7). The partIdx depends on the angle index i.

If sType is equal to 0 or 1, Mv0 or Mv1 are stored in the corresponding motion field, otherwise if sType is equal to 2, a combined MV from Mv0 and Mv2 are stored. The combined Mv are generated using the following process:

1) If Mv1 and Mv2 are from different reference picture lists (one from L0 and the other from L1), then Mv1 and Mv2 are simply combined to form the bi-prediction motion vectors.

2) Otherwise, if Mv1 and Mv2 are from the same list, only uni-prediction motion Mv2 is stored.

Intra Mode Coding with 67 Intra Prediction Modes

To capture the arbitrary edge directions presented in natural video, the number of directional intra modes in VVC is extended from 33, as used in HEVC, to 65. The new directional modes not in HEVC are depicted as dotted arrows in FIG. 18, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighbouring intra modes. The following three aspects are considered to construct the MPM list:

Default intra modes
Neighbouring intra modes
Derived intra modes.

A unified 6-MPM list is used for intra blocks irrespective of whether MRL and ISP coding tools are applied or not. The MPM list is constructed based on intra modes of the left and above neighbouring block. Suppose the mode of the left is denoted as Left and the mode of the above block is denoted as Above, the unified MPM list is constructed as follows:

When a neighbouring block is not available, its intra mode is set to Planar by default.

If both modes Left and Above are non-angular modes:
MPM list→{Planar, DC, V, H, V−4, V+4}

If one of modes Left and Above is angular mode, and the other is non-angular:
Set a mode Max as the larger mode in Left and Above
MPM list→{Planar, Max, DC, Max−1, Max+1, Max−2}

If Left and Above are both angular and they are different:
Set a mode Max as the larger mode in Left and Above
if the difference of mode Left and Above is in the range of 2 to 62, inclusive
MPM list→{Planar, Left, Above, DC, Max−1, Max+1}
Otherwise
MPM list→{Planar, Left, Above, DC, Max−2, Max+2}

If Left and Above are both angular and they are the same:
MPM list→{Planar, Left, Left−1, Left+1, DC, Left−2}

Besides, the first bin of the MPM index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

To support these prediction directions, the top reference with length 2W+1, and the left reference with length 2H+1, are defined as shown in FIG. 19A and FIG. 19B respectively.

The number of replaced modes in wide-angular direction mode depends on the aspect ratio of a block. The replaced intra prediction modes are illustrated in Table 3.

TABLE 3

| Intra prediction modes replaced by wide-angular modes | |
| --- | --- |
| Aspect ratio | Replaced intra prediction modes |
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Mode 57, 58, 59, 60, 61, 62, 63, 64, 65, 66 |
| W/H == ⅛ | Modes 55, 56 |
| W/H == 1/16 | Modes 53, 54, 55, 56 |

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135° and above 45°, luma intra prediction modes ranging from 2 to 5 are mapped to 2. Therefore, chroma DM derivation table for 4:2:2 chroma format is updated by replacing some values of the entries of the mapping table to convert prediction angle more precisely for chroma blocks.

Decoder Side Intra Mode Derivation (DIMD)

When DIMD is applied, two intra modes are derived from the reconstructed neighbour samples, and those two predictors are combined with the planar mode predictor with the weights derived from the gradients. The DIMD mode is used as an alternative prediction mode and is always checked in the high-complexity RDO mode.

To implicitly derive the intra prediction modes of a blocks, a texture gradient analysis is performed at both the encoder and decoder sides. This process starts with an empty Histogram of Gradient (HoG) with 65 entries, corresponding to the 65 angular modes. Amplitudes of these entries are determined during the texture gradient analysis.

In the first step, DIMD picks a template of T=3 columns and lines from respectively left side and above side of the current block. This area is used as the reference for the gradient based intra prediction modes derivation.

In the second step, the horizontal and vertical Sobel filters are applied on all 3×3 window positions, centered on the pixels of the middle line of the template. At each window position, Sobel filters calculate the intensity of pure horizontal and vertical directions as $G_x$ and $G_y$, respectively. Then, the texture angle of the window is calculated as:

$$\text{angle} = \arctan(G_x/G_y), \qquad (15)$$

which can be converted into one of 65 angular intra prediction modes. Once the intra prediction mode index of current window is derived as idx, the amplitude of its entry in the HoG[idx] is updated by addition of:

$$ampl = |G_x| + |G_y| \qquad (16)$$

FIGS. 20A-C show an example of HoG, calculated after applying the above operations on all pixel positions in the template. FIG. 20A illustrates an example of selected template 2020 for a current block 2010. Template 2020 comprises T lines above the current block and T columns to the left of the current block. For intra prediction of the current block, the area 2030 at the above and left of the current block corresponds to a reconstructed area and the area 2040 below and at the right of the block corresponds to an unavailable area. FIG. 20B illustrates an example for T=3 and the HoGs are calculated for pixels 2060 in the middle line and pixels 2062 in the middle column. For example, for pixel 2052, a 3×3 window 2050 is used. FIG. 20C illustrates an example of the amplitudes (ampl) calculated based on equation (16) for the angular intra prediction modes as determined from equation (15).

Once HoG is computed, the indices with two tallest histogram bars are selected as the two implicitly derived intra prediction modes for the block and are further combined with the Planar mode as the prediction of DIMD mode. The prediction fusion is applied as a weighted average of the above three predictors. To this aim, the weight of planar is fixed to 21/64 (~⅓). The remaining weight of 43/64 (~⅔) is then shared between the two HoG IPMs, proportionally to the amplitude of their HoG bars. FIG. 21 illustrates an example of the blending process. As shown in FIG. 21, two intra modes (M1 2112 and M2 2114) are selected according to the indices with two tallest bars of histogram bars 2110. The three predictors (2140, 2142 and 2144) are used to form the blended prediction. The three predictors correspond to applying the M1, M2 and planar intra modes (2120, 2122 and 2124 respectively) to the reference pixels 2130 to form the respective predictors. The three predictors are weighted by respective weighting factors ($\omega_1$, $\omega_2$ and $\omega_3$) 2150. The weighted predictors are summed using adder 2152 to generated the blended predictor 2160.

Besides, the two implicitly derived intra modes are included into the MPM list so that the DIMD process is performed before the MPM list is constructed. The primary derived intra mode of a DIMD block is stored with a block and is used for MPM list construction of the neighbouring blocks.

Template-Based Intra Mode Derivation (TIMD)

Template-based intra mode derivation (TIMD) mode implicitly derives the intra prediction mode of a CU using a neighbouring template at both the encoder and decoder, instead of signalling the intra prediction mode to the decoder. As shown in FIG. 22, the prediction samples of the template (2212 and 2214) for the current block 2210 are generated using the reference samples (2220 and 2222) of the template for each candidate mode. A cost is calculated as the SATD (Sum of Absolute Transformed Differences) between the prediction samples and the reconstruction samples of the template. The intra prediction mode with the minimum cost is selected as the DIMD mode and used for intra prediction of the CU. The candidate modes may be 67 intra prediction modes as in VVC or extended to 131 intra prediction modes. In general, MPMs can provide a clue to indicate the directional information of a CU. Thus, to reduce the intra mode search space and utilize the characteristics of a CU, the intra prediction mode can be implicitly derived from the MPM list.

For each intra prediction mode in MPMs, the SATD between the prediction and reconstruction samples of the template is calculated. First two intra prediction modes with the minimum SATD are selected as the TIMD modes. These two TIMD modes are fused with weights after applying PDPC process, and such weighted intra prediction is used to code the current CU. Position dependent intra prediction combination (PDPC) is included in the derivation of the TIMD modes.

The costs of the two selected modes are compared with a threshold, in the test, the cost factor of 2 is applied as follows:

$$costMode2 < 2 * costMode1.$$

If this condition is true, the fusion is applied, otherwise only model is used. Weights of the modes are computed from their SATD costs as follows:

$$weight1 = costMode2/(costMode1 + costMode2)$$

$$weight2 = 1 - weight1.$$

Intra Sub-Partitions (ISP)

The intra sub-partitions (ISP) divides luma intra-predicted blocks vertically or horizontally into 2 or 4 sub-partitions depending on the block size. For example, the minimum block size for ISP is 4×8 (or 8×4). If block size is greater than 4×8 (or 8×4), then the corresponding block is divided by 4 sub-partitions. It has been noted that the M×128 (with M≤64) and 128×N (with N≤64) ISP blocks could generate a potential issue with the 64×64 VDPU (Virtual Decoder Pipeline Unit). For example, an M×128 CU in the single tree case has an M×128 luma TB and two corresponding $$\frac{M}{2} \times 64$$

chroma TBs. If the CU uses ISP, then the luma TB will be divided into four M×32 TBs (only the horizontal split is possible), each of them smaller than a 64×64 block. However, in the current design of ISP chroma blocks are not divided. Therefore, both chroma components will have a size greater than a 32×32 block. Analogously, a similar situation could be created with a 128×N CU using ISP. Hence, these two cases are an issue for the 64×64 decoder pipeline. For this reason, the CU size that can use ISP is restricted to a maximum of 64×64. FIG. 23A and FIG. 23B shows examples of the two possibilities. All sub-partitions fulfil the condition of having at least 16 samples.

In ISP, the dependence of 1×N and 2×N subblock prediction on the reconstructed values of previously decoded 1×N and 2×N subblocks of the coding block is not allowed so that the minimum width of prediction for subblocks becomes four samples. For example, an 8×N (N>4) coding block that is coded using ISP with vertical split is partitioned into two prediction regions each of size 4×N and four transforms of size 2×N. Also, a 4×N coding block that is coded using ISP with vertical split is predicted using the full 4×N block; four transform each of 1×N is used. Although the transform sizes of 1×N and 2×N are allowed, it is asserted that the transform of these blocks in 4×N regions can be performed in parallel. For example, when a 4×N prediction region contains four 1×N transforms, there is no transform in the horizontal direction; the transform in the vertical direction can be performed as a single 4×N transform in the vertical direction. Similarly, when a 4×N prediction region contains two 2×N transform blocks, the transform operation of the two 2×N blocks in each direction (horizontal and vertical) can be conducted in parallel. Thus, there is no delay added in processing these smaller blocks compared to processing 4×4 regular-coded intra blocks.

TABLE 4

| Block Size | Coefficient group Size |
|---|---|
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed consecutively. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode. The followings are summary of interaction of ISP with other coding tools.

Multiple Reference Line (MRL): if a block has an MRL index other than 0, then the ISP coding mode will be inferred to be 0 and therefore ISP mode information will not be sent to the decoder.

Entropy coding coefficient group size: the sizes of the entropy coding subblocks have been modified so that they have 16 samples in all possible cases, as shown in Table 4. Note that the new sizes only affect blocks produced by ISP in which one of the dimensions is less than 4 samples. In all other cases coefficient groups keep the 4×4 dimensions.

CBF coding: it is assumed to have at least one of the sub-partitions has a non-zero CBF. Hence, if n is the number of sub-partitions and the first n−1 sub-partitions have produced a zero CBF, then the CBF of the n-th sub-partition is inferred to be 1.

Transform size restriction: all ISP transforms with a length larger than 16 points uses the DCT-II.

MTS flag: if a CU uses the ISP coding mode, the MTS CU flag will be set to 0 and it will not be sent to the decoder. Therefore, the encoder will not perform RD tests for the different available transforms for each resulting sub-partition. The transform choice for the ISP mode will instead be fixed and selected according the intra mode, the processing order and the block size utilized. Hence, no signalling is required. For example, let $t_H$ and $t_V$ be the horizontal and the vertical transforms selected respectively for the w×h sub-partition, where w is the width and h is the height. Then the transform is selected according to the following rules:

If w=1 or h=1, then there is no horizontal or vertical transform respectively.

If w≥4 and w≤16, $t_H$=DST-VII, otherwise, $t_H$=DCT-II

If h≥4 and h≤16, $t_V$=DST-VII, otherwise, $t_V$=DCT-II

In ISP mode, all 67 intra modes are allowed. PDPC is also applied if corresponding width and height is at least 4 samples long. In addition, the reference sample filtering process (reference smoothing) and the condition for intra interpolation filter selection doesn't exist anymore, and Cubic (DCT-IF) filter is always applied for fractional position interpolation in ISP mode.

Multi-Hypothesis Prediction (MHP)

In the multi-hypothesis inter prediction mode (JVET-M0425), one or more additional motion-compensated prediction signals are signalled, in addition to the conventional bi-prediction signal.

The resulting overall prediction signal is obtained by sample-wise weighted superposition. With the bi-prediction signal $p_{bi}$ and the first additional inter prediction signal/hypothesis $h_3$, the resulting prediction signal $p_3$ is obtained as follows:

$$p_3 = (1 - \alpha)p_{bi} + \alpha h_3 \qquad (17)$$

The weighting factor $\alpha$ is specified by the new syntax element add_hyp_weight_idx, according to the following mapping (Table 5):

TABLE 5

| Mapping α to add_hyp_weight_idx | |
|---|---|
| add_hyp_weight_idx | α |
| 0 | ¼ |
| 1 | −⅛ |

Analogously to above, more than one additional prediction signal can be used. The resulting overall prediction signal is accumulated iteratively with each additional prediction signal.

$$p_{n+1} = (1 - \alpha_{n+1})p_n + \alpha_{n+1} h_{n+1} \qquad (18)$$

The resulting overall prediction signal is obtained as the last $p_n$ (i.e., the $p_n$ having the largest index n). For example, up to two additional prediction signals can be used (i.e., n is limited to 2).

The motion parameters of each additional prediction hypothesis can be signalled either explicitly by specifying the reference index, the motion vector predictor index, and the motion vector difference, or implicitly by specifying a merge index. A separate multi-hypothesis merge flag distinguishes between these two signalling modes.

For inter AMVP mode, MHP is only applied if non-equal weight in BCW is selected in bi-prediction mode. Details of MHP for VVC can be found in JVET-W2025 (Muhammed Coban, et. al., "Algorithm description of Enhanced Compression Model 2 (ECM 2)", Joint Video Experts Team (JVET) of ITU-T SG 16 WP 3 and ISO/IEC JTC 1/SC 29, 23rd Meeting, by teleconference, 7-16 Jul. 2021, Document: JVET-W2025).

GPM Extension

Several variations of GPM mode (JVET-W0097 (Zhipin Dong, et. al., "AEE2-related: Combination of EE2-3.3, EE2-3.4 and EE2-3.5", Joint Video Experts Team (JVET) of ITU-T SG 16 WP 3 and ISO/IEC JTC 1/SC 29, 23rd Meeting, by teleconference, 7-16 Jul. 2021, Document: JVET-W0097) and JVET-Y0065 (Yoshitaka Kidani, et. al., "EE2-3.1: GPM with inter and intra prediction (JVET- X0166)", Joint Video Experts Team (JVET) of ITU-T SG 16 WP 3 and ISO/IEC JTC 1/SC 29, 25th Meeting, by tele-conference, 12-21 Jan. 2022, Document: JVET-Y0065)) have been proposed to improve the coding efficiency of the GPM mode in the VVC. The methods were included in the exploration experiment (EE2) for further evaluations, the main technical aspects of which are described as follows:

EE2-3.3 on GPM with MMVD (GPM-MMVD): 1) additional MVDs are added to the existing GPM merge candidates; 2) the MVDs are signalled in the same manner as the MMVD in the VVC, i.e., one distance index plus one direction index; 3) two flags are signalled to separately control whether the MMVD is applied to each GPM partition or not.

EE2-3.4-3.5 on GPM with template matching (GPM-TM): 1) template matching is extended to the GPM mode by refining the GPM MVs based on the left and above neighbouring samples of the current CU; 2) the template samples are selected dependent on the GPM split direction; 3) one single flag is signalled to jointly control whether the template matching is applied to the MVs of two GPM partitions or not.

JVET-W0097 proposes a combination of EE2-3.3, EE2-3.4 and EE2-3.5 to further improve the coding efficiency of the GPM mode. Specifically, in the proposed combination, the existing designs in EE2-3.3, EE2-3.4 and EE2-3.5 are kept unchanged while the following modifications are further applied for the harmonization of the two coding tools:

1) The GPM-MMVD and GPM-TM are exclusively enabled to one GPM CU. This is done by firstly signalling the GPM-MMVD syntax. When both two GPM-MMVD control flags are equal to false (i.e., the GPM-MMVD are disabled for two GPM partitions), the GPM-TM flag is signalled to indicate whether the template matching is applied to the two GPM partitions. Otherwise (at least one GPM-MMVD flag is equal to true), the value of the GPM-TM flag is inferred to be false.

2) The GPM merge candidate list generation methods in EE2-3.3 and EE2-3.4-3.5 are directly combined in a manner that the MV pruning scheme in EE2-3.4-3.5 (where the MV pruning threshold is adapted based on the current CU size) is applied to replace the default MV pruning scheme applied in EE2-3.3; additionally, as in EE2-3.4-3.5, multiple zero MVs are added until the GPM candidate list is fully filled.

In JVET-Y0065, in GPM with inter and intra prediction (or named GPM intra), the final prediction samples are generated by weighting inter predicted samples and intra predicted samples for each GPM-separated region. The inter predicted samples are derived by the same scheme as the GPM in the current ECM whereas the intra predicted samples are derived by an intra prediction mode (IPM) candidate list and an index signalled from the encoder. The IPM candidate list size is pre-defined as 3. The available IPM candidates are the parallel angular mode against the GPM block boundary (Parallel mode), the perpendicular angular mode against the GPM block boundary (Perpendicular mode), and the Planar mode as shown FIGS. 24A-C, respectively. Furthermore, GPM with intra and intra prediction as shown FIG. 24D is restricted in the proposed method to reduce the signalling overhead for IPMs and avoid an increase in the size of the intra prediction circuit on the hardware decoder. In addition, a direct motion vector and IPM storage on the GPM-blending area is introduced to further improve the coding performance.

Spatial GPM

Similar to inter GPM, Spatial GPM (SGPM) consists of one partition mode and two associated intra prediction modes. If these modes are directly signalled in the bit-stream, as shown in FIG. 25A, it would yield significant overhead bits. To express the necessary partition and prediction information more efficiently in the bit-stream, a candidate list is employed and only the candidate index is signalled in the bit-stream. Each candidate in the list can derive a combination of one partition mode and two intra prediction modes, as shown in FIG. 25B.

A template is used to generate this candidate list. The shape of the template is shown in FIG. 26. For each possible combination of one partition mode and two intra prediction modes, a prediction is generated for the template with the partitioning weight extended to the template, as shown in FIG. 26. These combinations are ranked in ascending order of their SATD between the prediction and reconstruction of the template. The length of the candidate list is set equal to 16, and these candidates are regarded as the most probable SGPM combinations of the current block. Both encoder and decoder construct the same candidate list based upon the template.

To reduce the complexity in building the candidate list, both the number of possible partition modes and the number of possible intra prediction modes are pruned. In the following test, 26 out of 64 partition modes are used, and only the MPMs out of 67 intra prediction modes are used.

While the GPM along with blending for the boundary region has shown improvement in coding performance, it is desired to develop adaptive blending prediction to further improve the coding performance.

BRIEF SUMMARY OF THE INVENTION

A method and apparatus for video coding are disclosed. According to this method, data associated with a current block at an encoder side or coded data associated with the current block to be decoded at a decoder side are received. The current block is partitioned into a first region and a second region along a partition line. A blending region around the partition line is determined, wherein the blending region includes a first blending region comprising first pixels in the first region defined by the partition line and distance_1 and a second blending region comprising second pixels in the second region defined by the partition line and distance_2, and wherein the distance_1 and the distance_2 correspond to two non-negative values and two non-negative values are allowed to be different. A first predictor and a second predictor are determined for the first region and the second region respectively. A blended predictor for the blending region are generated by blending the first predictor and the second predictor. The current block is encoded or decoded by using prediction data comprising the blended predictor.

In one embodiment, the blended predictor is generated as a weighted sum of the first predictor and the second predictor.

In one embodiment, a candidate set for a size of the blending region is pre-defined, wherein the size of the blending region is related to the distance_1 and the distance_2. In another embodiment, the size of the blending region for the current block is determined implicitly according to a target member of the candidate set achieving a smallest template matching cost, and wherein the template matching cost is measured based on a template of the current block and an extended blending region.

In one embodiment, an explicit index is signalled or parsed to indicate the size of the blending region selected from the candidate set for the current block. For example, a syntax related to the explicit index can be signalled at a block-level, SPS (Sequence Parameter Set)-level, PPS (Picture Parameter Set)-level, APS (Adaptation Parameter Set)-level, PH (Picture Header)-level, SH (Slice header)-level or a combination thereof. In one embodiment, the candidate set is reordered according to a cost associated with each member of the candidate set. In one embodiment, the cost corresponds to a template matching cost measured based on a template and an extended blending region, and wherein the template comprises a left neighbouring area of the current block, a top neighbouring area of the current block, or both.

In one embodiment, a target candidate of (the distance_1, the distance_2) is selected from a candidate set for the current block according to a block size of the current block. The block size may correspond to block width, block height, or block area. In one embodiment, the candidate set comprises data pairs corresponding to combinations of the distance_1 and the distance_2, and wherein each of the distance_1 and the distance_2 is selected from a value group including of 0, 1, 2, 4 and 8.

In one embodiment, if either block width or block height is smaller than a pre-defined threshold, only smaller values of the value group are used to form the data pairs for the candidate set. In another embodiment, if the first region is smaller than the second region, the distance_1 is set to a smaller value than the distance_2. In yet another embodiment, if the first region is larger than the second region, the distance_1 is set to a larger value than the distance_2.

In one embodiment, the first predictor and the second predictor correspond to hypotheses of prediction comprising one or more first predictions from motion with a pre-defined direction or bi-direction, one or more second predictions generated from a motion candidate, one or more third predictions from an intra candidate, one or more motion candidates, or a combination thereof.

BRIEF DESCRIPTION OF THE DRAWINGS

FIG. 12 illustrates an example of the weight value derivation for Combined Inter and Intra Prediction (CIIP) according to the coding modes of the top and left neighbouring blocks.

FIG. 13 illustrates an example of the of 64 partitions used in the VVC standard, where the partitions are grouped according to their angles and dashed lines indicate redundant partitions.

FIG. 14 illustrates an example of uni-prediction MV selection for the geometric partitioning mode.

FIGS. 24A-C illustrate examples of available IPM candidates: the parallel angular mode against the GPM block boundary (Parallel mode, FIG. 24A), the perpendicular angular mode against the GPM block boundary (Perpendicular mode, FIG. 24B), and the Planar mode (FIG. 24C), respectively.

FIG. 24D illustrates an example of GPM with intra and intra prediction, where intra prediction is restricted to reduce the signalling overhead for IPMs and hardware decoder cost.

FIG. 25A illustrates the syntax coding for Spatial GPM (SGPM) before using a simplified method.

FIG. 25B illustrates an example of simplified syntax coding for Spatial GPM (SGPM).

FIG. 26 illustrates an example of template for Spatial GPM (SGPM).

DETAILED DESCRIPTION OF THE INVENTION

Figure 1A:
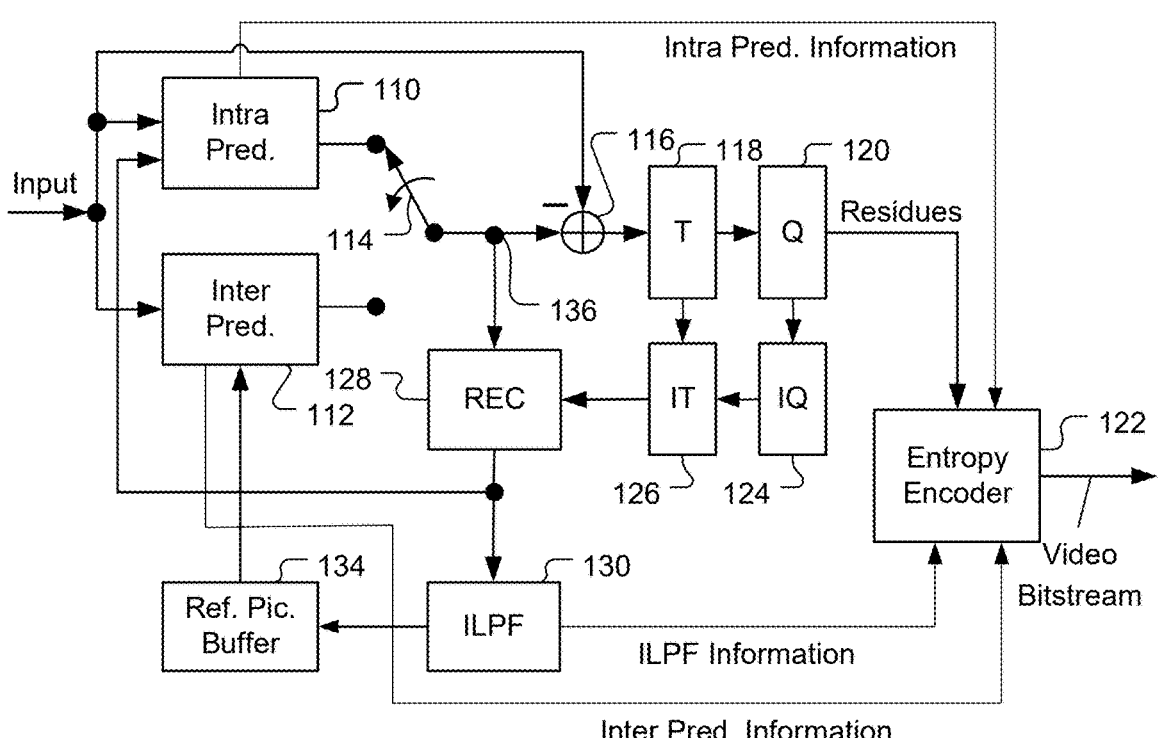
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

To improve video coding efficiency, blending one or more hypotheses of predictions with the existing one or more hypotheses of predictions is used for achieving a better accuracy of prediction. In one embodiment, a hypothesis of prediction means prediction from motion with a pre-defined direction (either list0 or list1). In another embodiment, a hypothesis of prediction means prediction generated from a motion candidate (e.g. a merging candidate or an AMVP candidate). In another embodiment, a hypothesis of prediction means prediction from motion with a pre-defined direction (either list0 or list1) or bi-prediction. In another embodiment, a hypothesis of prediction means prediction from an intra candidate, a motion candidate, a candidate with a third mode type. For example, all hypotheses of predictions are from intra candidates. For another example, all hypotheses of predictions are from motion candidates. For another example, one or more hypotheses of predictions are from one or more intra candidates and another one or more hypotheses of predictions are from one or more motion candidates. In another embodiment, a hypothesis of prediction means prediction from an intra candidate. The intra candidates can refer to any intra prediction modes specified in the standard. For example, the intra prediction modes can be DC, planar, angular prediction modes, TIMD, DIMD, chroma intra prediction modes, or any subset of the above. The chroma intra prediction modes include cross-component prediction modes which predict the chroma predictor in the current block by using collocated luma reconstructed samples with one or more linear and/or non-linear models. For example, the cross-component prediction mode refers to a CCLM mode or any extension or option from CCLM. The candidate with a third mode type may refer to the candidate with any mode type defined in the standard. For example, the candidate with a third mode type refers to the intra block copy candidate which uses block vectors to predict the current block by referencing the reconstructed samples in the same picture as the current block. The embodiments for intra candidates and/or motion candidates can be used as the embodiments for the candidates with the third mode type. In another embodiment, the blending-prediction tools refer to (but not limited to) any one or more tools listed as follows or any combination of the listed tools.

The blending-prediction tools include bi-prediction motion candidates, which can be merging candidates and/or AMVP candidates.

The blending-prediction tools include GPM, one or more variations in GPM extension, and/or spatial GPM.

Since more than one hypothesis of prediction is used for the current block, a blending process is required for forming the final prediction of the current block. The current block may belong to luma or chroma component. For single tree splitting, luma and chroma components are in the same tree splitting structure and the proposed methods can be used for only luma component, only chroma components, or both luma and chroma components. For dual tree splitting, luma and chroma are in different tree splitting structures and the proposed methods can be used for only luma component, only chroma components, or both luma and chroma components. In one embodiment, when the proposed methods are used in both luma and chroma components, the setting of the proposed methods are unified for luma and chroma components. For an example of luma and chroma components in the same tree splitting structure, the luma and chroma components in the same coding unit use unified setting of the proposed methods. For another example of luma and chroma components in different tree splitting structures, chroma blocks follow the setting of the proposed methods used for one or more collocated luma blocks.

In this invention, an adaptive blending process is proposed to improve the weighting scheme used in blending predictions. In the following, take GPM to be the blending tool as an example. Nevertheless, the proposed adaptive blending process can be applied to one or more mentioned blending-prediction tools and/or any combination of mentioned blending-prediction tools.

Figure 27:
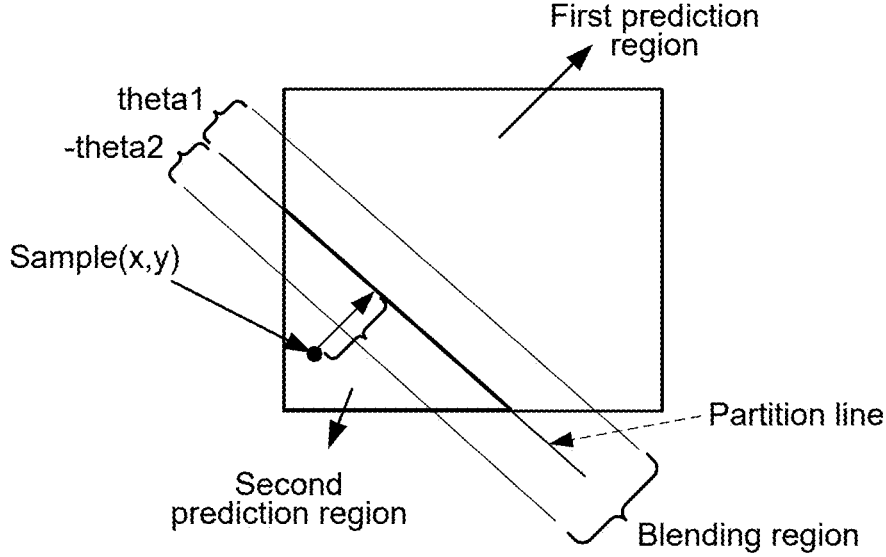
FIG. 27 illustrates an example of adaptive blending with individual blending sizes for the two blending regions according to one embodiment of the present invention.

According to embodiments of the present invention, a partition line (e.g. GPM partition boundary) is first defined to divide the current block into two prediction regions as shown in FIG. 27. The region near the partition line (i.e., theta1 from the partition line and −theta2 from the partition line) is defined as the blending region. Here, theta1 and theta2 are two non-negative values and the notation of −theta2 is intended to indicate the blending region 2 is on another side of the partition line from the blending region 1. The sizes of the blending region 1 and blending region 2 are referred as theta1 (or distance_1) and theta2 (or distance_2) respectively. Inside the blending region, multiple (e.g. 2, first_hyp_pred and second_hyp_pred) hypotheses of predictions are combined with weighting (referring to W0[x][y]). Outside the blending region: for those samples located at the first prediction region, the weight for second hypothesis of prediction is zero and the weight for the first hypothesis of prediction is N, and N is a positive integer; for those samples located at the second prediction region, the weight for the first hypothesis of prediction is zero and the weight for the second hypothesis of prediction is N. Several embodiments are proposed:

In one embodiment, final_pred[x][y]=(first_hyp_pred [x][y]*W0[x][y]+second_hyp_pred [x][y]*(N−W0[x][y])+offset1)>>shift1

(x, y) is a sample position in the current block.

For the sample located at (x, y) in the current block, W0[x][y] is the weight for first_hyp_pred and (N−W0[x][y]) is the weight for second_hyp_pred.

In another embodiment, N is pre-defined as a fix positive integer (e.g. 8, 16, 32, or 64) or specified by a block-level, SPS (Sequence Parameter Set)-level, PPS (Picture Parameter Set)-level, APS (Adaptation Parameter Set)-level, PH (Picture header)-level, and/or SH (Slice header)-level syntax.

In another embodiment, offset1 and shift1 are decided according to N and/or BitDepth. For the example of N=8, $$\circ \; shift1 = Max(5, 17 - BitDepth)$$

$$\circ \; offset1 = 1 \ll ( shift1 - 1 )$$

In another embodiment, if sample (x, y) is at second prediction region ((i.e., distance (x, y) smaller than or equal to −theta2), W0[x][y] is defined as 0. Alternatively, W0[x][y] is defined following the derivation for the blending region which results in a value equal to 0 or approaching to 0.

In another embodiment, if sample (x, y) is at first prediction region (i.e., distance (x, y) larger than or equal to theta1), W0[x][y] is defined as N. Alternatively, W0[x][y] is defined following the derivation for the blending region which results in a value equal to N or approaching to N.

In another embodiment, theta1 equal to 0 means no blending within the first prediction region. In this case, W0[x][y] is defined as N in the first prediction region.

In another embodiment, theta2 equal to 0 means no blending within the second prediction region. That is, W0[x][y] is defined as 0 in the second prediction region.

In another embodiment, if sample (x, y) is at the blending region (i.e., distance (x, y) larger than −theta2 and smaller than theta1), W0[x][y] is defined according to the distance, theta1 and/or theta2. For example, W0[x][y] is defined following the existing GPM weight derivation (e.g. VVC method) with setting the theta (used in GPM weight derivation) as our proposed theta1 or theta2.

In another sub-embodiment, if sample (x, y) is at the blending region within the first prediction region ((i.e., distance (x, y) larger than 0 and smaller than theta1), W0[x][y] is defined according to the distance and theta1. For example, W0[x][y] is defined as (N*(distance (x, y)+theta1))/(2*theta1) or can be simplified by quantizing. For example, after quantizing, W0[x][y] is defined as ((distance'(x, y)+16*theta1+offset2)>>shift2) with clipping to [0, N].

distance' can be wldxL in the GPM introduction section offset2=theta1>>1 shift2=log 2(theta1)

For another example, after quantizing, W0[x][y] is defined as ((distance'(x, y)+16*theta1+offset3)>>shift3) with clipping to [0, N].

distance' can be wldxL in the GPM introduction section.

Offset3 can be N right-shifted by 1. Shift3 can be log 2(N). Take N equal to 8 as an example. Offset3 will be 4 and shift3 will be 3.

In another sub-embodiment, if sample (x, y) is at the blending region within the second prediction region (distance (x, y) is smaller than 0 and larger than −theta2), W0[x][y] is defined according to distance and theta2. For example, W0[x][y] is defined as (N*(distance (x, y)+theta2))/(2*theta2) or can be simplified by quantizing. For example, after quantizing, W0[x][y] is define as ((distance'(x, y)+16*theta2+offset2)>>shift2) with clipping to [0, N].

distance' can be wldxL in the GPM introduction section offset2=theta2>>1 shift2=log 2(theta2)

For another example, after quantizing, W0[x][y] is defined as ((distance'(x, y)+16*theta2+offset3)>>shift3) with clipping to [0, N].

distance' can be wldxL in the GPM introduction section

Offset3 can be N right-shifted by 1. Shift3 can be log 2(N). Take N equal to 32 as an example. Offset3 will be 16 and shift3 will be 5.

In another sub-embodiment, if sample (x, y) is at the blending region on the partition line (distance (x, y) is equal to 0), W0[x][y] is defined as the case "sample (x, y) is at the blending region within first prediction region", the case "sample (x, y) is at the blending region within second prediction region", any proposed embodiments, or defined as equal weight (N>>1).

According to the present invention, some embodiments are proposed to decide the values of theta1 and theta2 as follows. In one embodiment, the values of theta1 and theta2 refers to how many pixels or samples. For example, the value equal to 2 means 2-pel. In another embodiment, one value is used as an anchor for the remaining values. For example, if the value equal to 2 is the anchor, the blending size based on the value equal to 1 is half of the blending size based on the value equal to 2 and the blending size based on the value equal to 4 is double of the blending size based on the value equal to 2.

In one embodiment, theta1 is predefined as a fixed value (e.g. 0, ½, ¼, 1, 2, 4 or 8) or specified by a block-level, SPS-level, PPS-level, APS-level, PH-level, and/or SH-level syntax. Similarly, theta2 can be predefined as a fixed value or specified by a block-level, SPS-level, PPS-level, APS-level, PH-level, and/or SH-level syntax.

In another embodiment, theta1 is selected from a candidate set including at least one candidate values. Similarly, theta2 can be selected from a candidate set including at least one candidate values.

In one sub-embodiment, the candidate set includes at least one of $\{0, \frac{1}{2}, \frac{1}{4}, 1, 2, 4$ or $8\}$ or any combinations of the above values.

In another sub-embodiment, the candidate set includes at least one of $\{a/b, a, b*a\}$ or any combinations of the above values, where a and b are set as positive integers. For example, a is equal to 2 and b is equal to 4.

In another sub-embodiment, the candidate set varies with the block width, block height, and/or the block area. For example, when the shorter side of the current block is equal to or smaller than a predefined threshold, only smaller values are included in the candidate set; otherwise only larger values are included in the candidate set.

In another embodiment, theta1 can be the same or different from theta2. The benefit of allowing different values of theta1 and theta2 (i.e., allowing asymmetric theta1 and theta2) is that the best blending quality for diverse video sequences may need different blending regions for the first prediction region and the second prediction region. For example, if the area of the first prediction region is smaller, theta1 should be smaller than theta2. Or in an inverse way, if the area of the first prediction region is larger, theta1 should be smaller than theta2.

In one sub-embodiment, theta1 and theta2 have their own candidate sets (e.g. theta1_set and theta2_set), respectively. For example, the candidate numbers (i.e., the number of candidates in a candidate set) for theta1_set and theta2_set can be different. For another example, one candidate set is the subset of the other candidate set. For another example, the candidate numbers for theta1_set and theta2_set are the same.

In another sub-embodiment, theta1 and theta2 share a single candidate set. For example, theta1 and theta2 are the same. For another example, theta1 and theta2 can be the same or different.

In another embodiment, the candidate number of the candidate set is defined as a fixed value (e.g. 3 or 5) or specified by a block-level, SPS-level, PPS-level, APS-level, PH-level, and/or SH-level syntax.

In another embodiment, the selection of theta1 and theta2 depends on explicit signalling.

In one sub-embodiment, two individual syntaxes are signalled at a block-level, SPS-level, PPS-level, APS-level, PH-level, and/or SH-level syntax to indicate theta1 and theta2, respectively. For example, theta1 and theta 2 are selected from a candidate set including $\{0, 1, 2, 4, 8\}$, respectively. An index (e.g. index_theta1, ranging from 0 to 4) is signalled to select one value from the candidate set and an index (e.g. index_theta2, ranging from 0 to 4) is signalled to select one value from the candidate set.

In one sub-embodiment, a syntax is signalled at a block-level, SPS-level, PPS-level, APS-level, PH-level, and/or SH-level syntax to indicate a combination of theta1 and theta2.

Theta1 and theta 2 are selected from a candidate set including $\{0, 1, 2, 4, 8\}$. The candidate combinations of theta1 and theta2, denoted as (theta1, theta2), can be (0, 0), (0, 1), (0, 2), (0, 4), (0, 8), (1, 0), (1, 1), (1, 2), (1, 4), (1, 8), (2, 0), (2, 1), (2, 2), (2, 4), (2, 8), (4, 0), (4, 1), (4, 2), (4, 4), (4, 8), (8, 0), (8, 1), (8, 2), (8, 4), (8, 8).

The number of candidate combinations can be reduced by other proposed methods in this invention. For example, when the area of the first prediction region is smaller, theta1 should be smaller than theta2. Therefore, those combinations with larger theta1 can be eliminated. In another example, when the shorter side of the current block is equal to or smaller than a predefined threshold, only smaller values are included in the candidate set so that the number of candidate combinations can be reduced.

An index (e.g. ranging from 0 to the number of candidate combinations−1) is signalled.

In one way, the index signalled can be coded with truncated unary coding.

In another way, the index can be context-coding.

In another way, the candidate combinations are reordered with their template costs in an ascending order to form a reordered list. Template cost measurement can be referenced in the section related to implicit derivation rule in this invention. The signalled index refers to the position of the used combination in the reordered list. Both the encoder and decoder construct the same reordered list based on the template. The candidate combination with smallest template cost uses the shortest codewords among all candidate combinations.

In another embodiment, the selection of theta1 and theta2 depends on an implicit derivation. In one sub-embodiment, template matching is used as the implicit derivation rule.

Step1: A template (or neighbouring region of the current block, which was encoded or decoded before the current block) is used to measure the cost for each candidate combination of theta1 and theta2. For example, theta1 and theta 2 are selected from a candidate set including $\{0, 1, 2, 4, 8\}$. The candidate combinations of theta1 and theta2, denoted as (theta1, theta2), can be (0, 0), (0, 1), (0, 2), (0, 4), (0, 8), (1, 0), (1, 1), (1, 2), (1, 4), (1, 8), (2, 0), (2, 1), (2, 2), (2, 4), (2, 8), (4, 0), (4, 1), (4, 2), (4, 4), (4, 8), (8, 0), (8, 1), (8, 2), (8, 4), (8, 8). The number of candidate combinations can be reduced by other proposed methods in this invention. For example, when the area of the first prediction region is smaller, theta1 should be smaller than theta2. Therefore, those combinations with larger theta1 can be eliminated. In another example, when the shorter side of the current block is equal to or smaller than a predefined threshold, only smaller values are included in the candidate set so that the number of candidate combinations can be reduced.

Step2: For each candidate combination, a template cost is calculated by the distortion between the "prediction" and reconstruction of the template.

Figure 28:
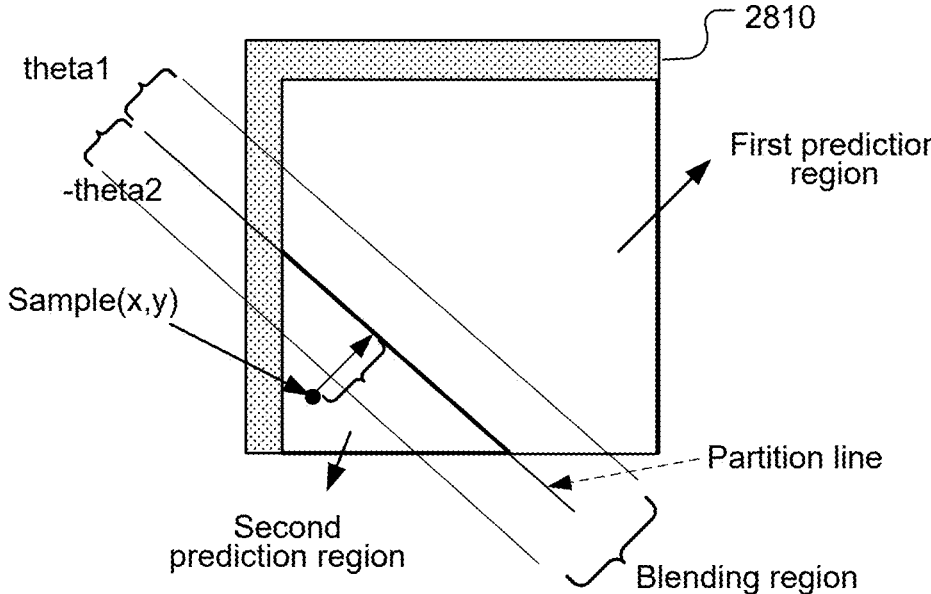
FIG. 28 illustrates an example of determining costs associated with individual blending sizes based on a template and extended blending regions according to one embodiment of the present invention.

The "prediction" is generated by applying GPM with blending (using the candidate combination) to the template. As shown in the FIG. 28, the partition line is extended to the template 2810. The template comprises a left neighbouring area (left template) of the current block, a top neighbouring area (above template) of the current block, or both. For example, the template selection depends on the information from the partition line. The information of the partition line may refer to angle of the partition line and/or the offset distance of the partition line. For example, for the angle belonging to or approaching to vertical partitioning, (only) above template is selected. For example, for the angle belonging to or approaching to horizontal partitioning, (only) left template is selected. For example, for the angle belonging to or approaching to diagonal partitioning (not belonging to or approaching to vertical or horizontal partitioning), left and above templates are selected. The blending weighting on the template is unified with the blending weighting for generating the blended predictor for the current block or is simplified by using less weights. For an example of using the simplified blending weighting on the template, the weights on the current block may be ranging from 0 to (X−1) and the weighting on the template may only have less than X weights. Only case is that only 0 and 1 are the weights on the template.

The distortion can be SATD, SAD (Sum of Absolute Differences), MSE (Mean Squared Errors), SSE (Sum of Squared Errors), or any distortion measurement equations/metrics.

Step3: theta1 and theta2 are implicitly set by the combination with the smallest template cost.

The proposed methods in this invention can be unified with multiple blending tools. For example, the proposed methods used for GPM, GPM extension, and/or spatial GPM are unified.

The proposed methods in this invention can only be applied to some predefined partition lines among all candidate partition lines.

The proposed methods in this invention can be enabled and/or disabled according to implicit rules (e.g. block width, height, or area) or according to explicit rules (e.g. syntax on block, tile, slice, picture, SPS, or PPS level). For example, the proposed method is applied when the block area is larger than a threshold. For another example, the proposed method is applied when the longer block side is larger than or equal to a threshold (e.g. 2) multiplied by the shorter block side.

The term "block" in this invention can refer to TU/TB, CU/CB, PU/PB, a predefined region, or CTU/CTB.

AMVP in this invention is similar to "AMVP" in JVET-T2002 (Jianle Chen, et. al., "Algorithm description for Versatile Video Coding and Test Model 11 (VTM 11)", Joint Video Experts Team (JVET) of ITU-T SG 16 WP 3 and ISO/IEC JTC 1/SC 29, 20th Meeting, by teleconference, 7-16 Oct. 2020, Document: JVET-T2002). AMVP motion is from a motion candidate with syntax "merge flag" equal to false. (e.g. general_merge_flag in VVC equal to false)

Any combination of the proposed methods in this invention can be applied.

Figure 1B:
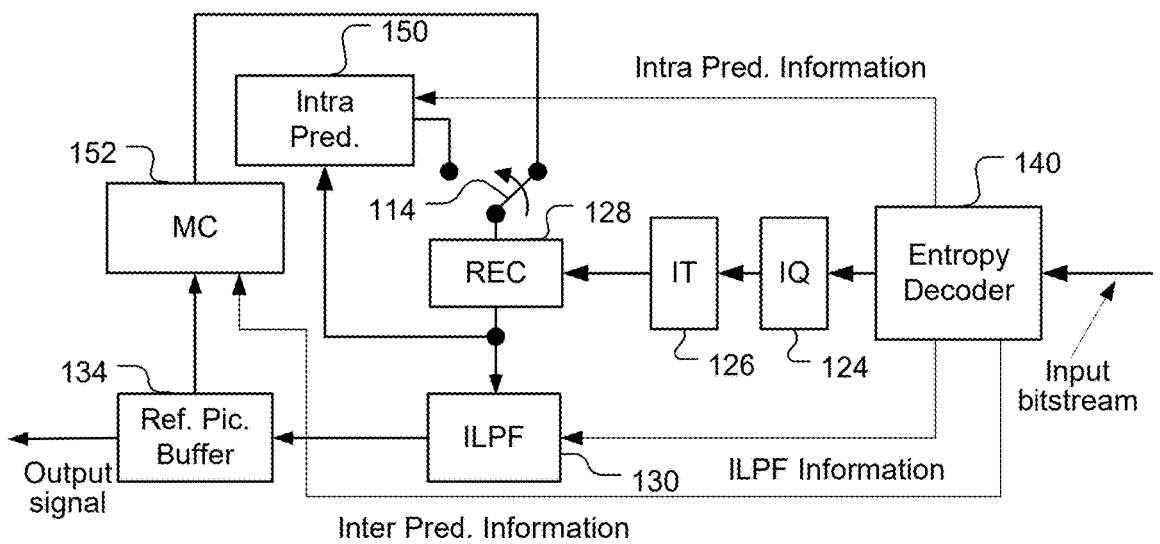
FIG. 1B illustrates a corresponding decoder for the encoder in FIG. 1A.
Figure 2:
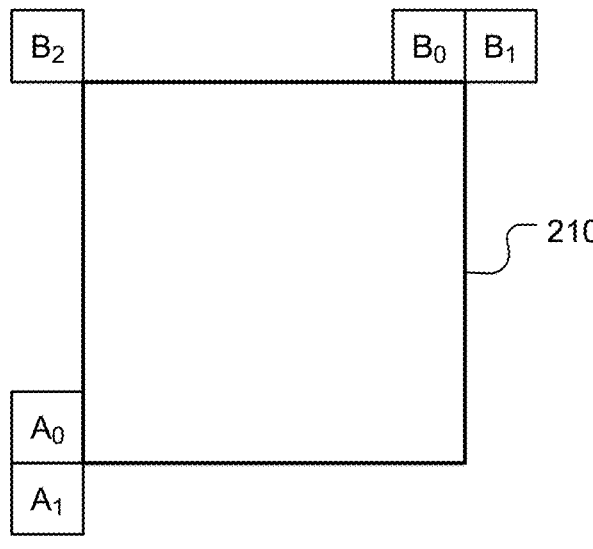
FIG. 2 illustrates the neighbouring blocks used for deriving spatial merge candidates for VVC.
Figure 3:
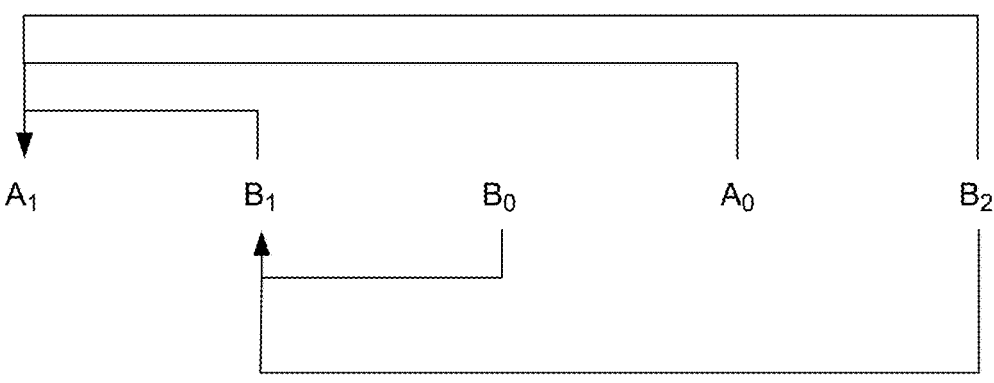
FIG. 3 illustrates the possible candidate pairs considered for redundancy check in VVC.
Figure 4:
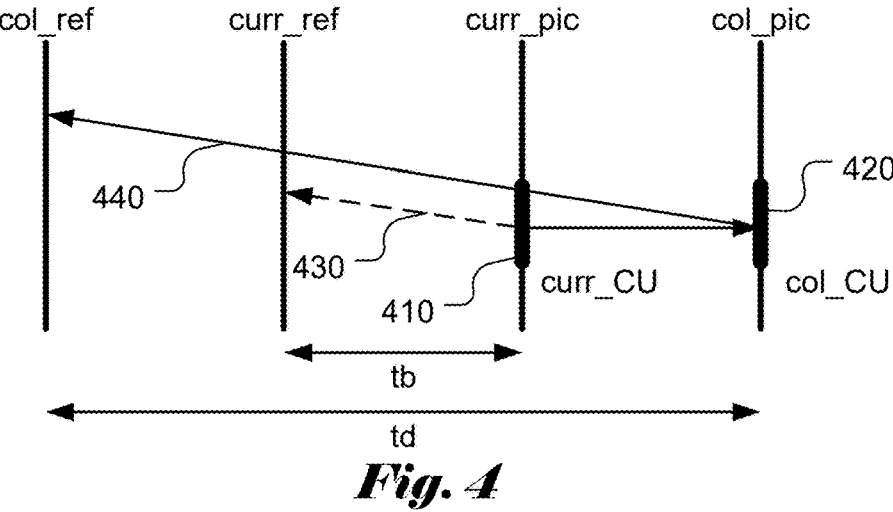
FIG. 4 illustrates an example of temporal candidate derivation, where a scaled motion vector is derived according to POC (Picture Order Count) distances.
Figure 5:
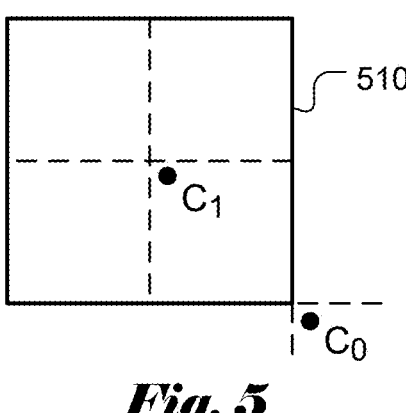
FIG. 5 illustrates the position for the temporal candidate selected between candidates $C_0$ and $C_1$.
Figure 6:
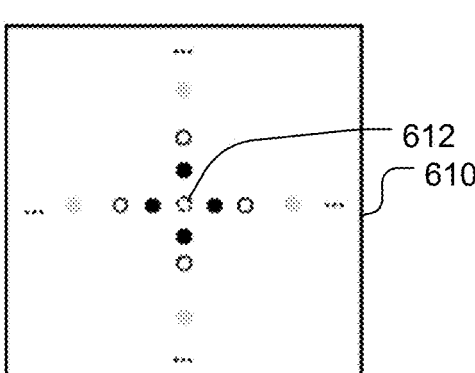
FIG. 6 illustrates the distance offsets from a starting MV in the horizontal and vertical directions according to Merge Mode with MVD (MMVD).
Figure 6:
Figure 7A:
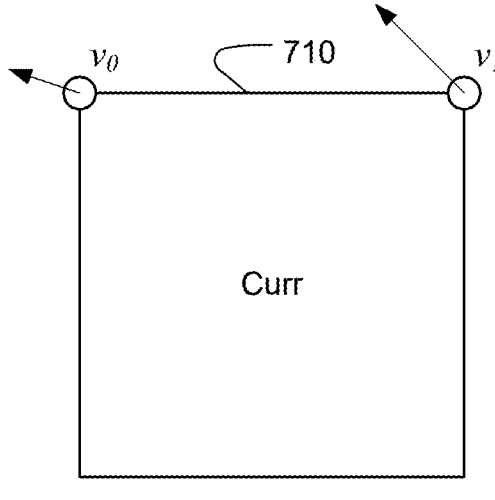
FIG. 7A illustrates an example of the affine motion field of a block described by motion information of two control point (4-parameter).
Figure 7B:
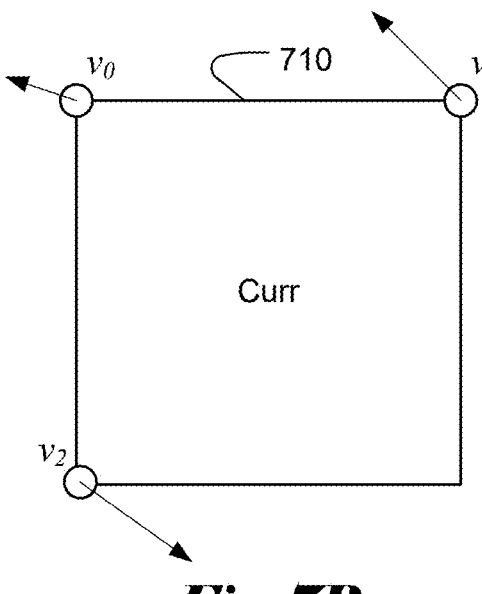
FIG. 7B illustrates an example of the affine motion field of a block described by motion information of three control point motion vectors (6-parameter).
Figure 8:
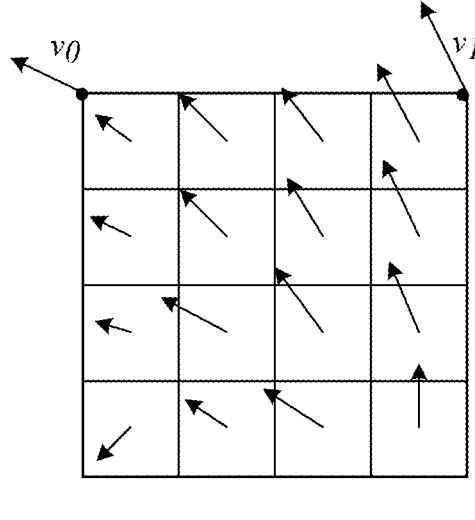
FIG. 8 illustrates an example of block based affine transform prediction, where the motion vector of each 4×4 luma subblock is derived from the control-point MVs.
Figure 9:
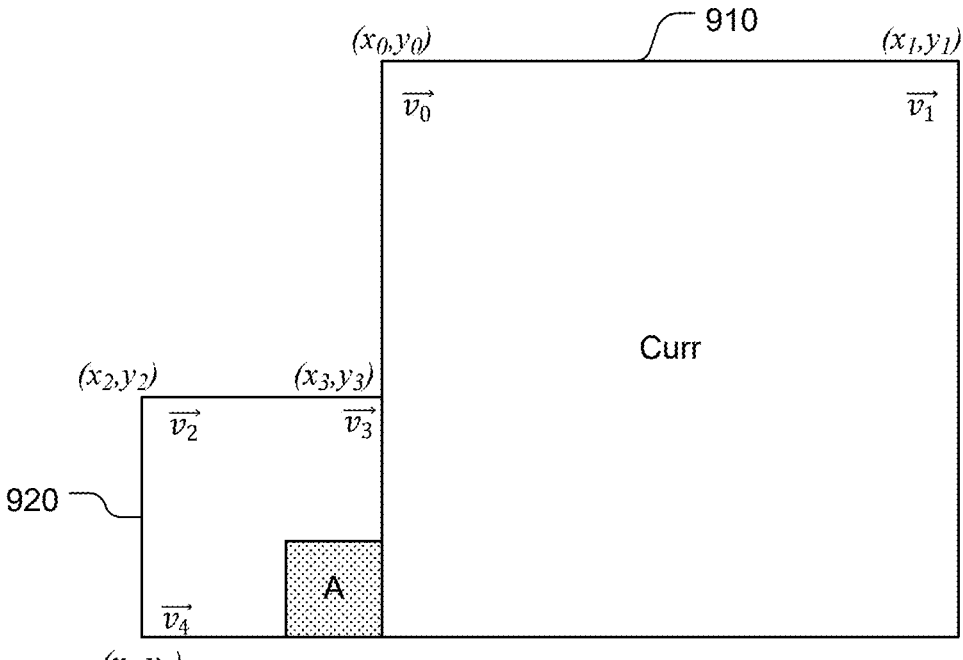
FIG. 9 illustrates an example of derivation for inherited affine candidates based on control-point MVs of a neighbouring block.
Figure 10:
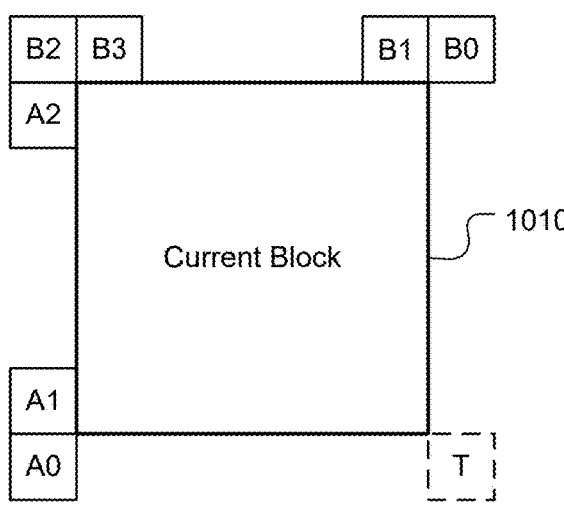
FIG. 10 illustrates an example of affine candidate construction by combining the translational motion information of each control point from spatial neighbours and temporal.
Figure 11:
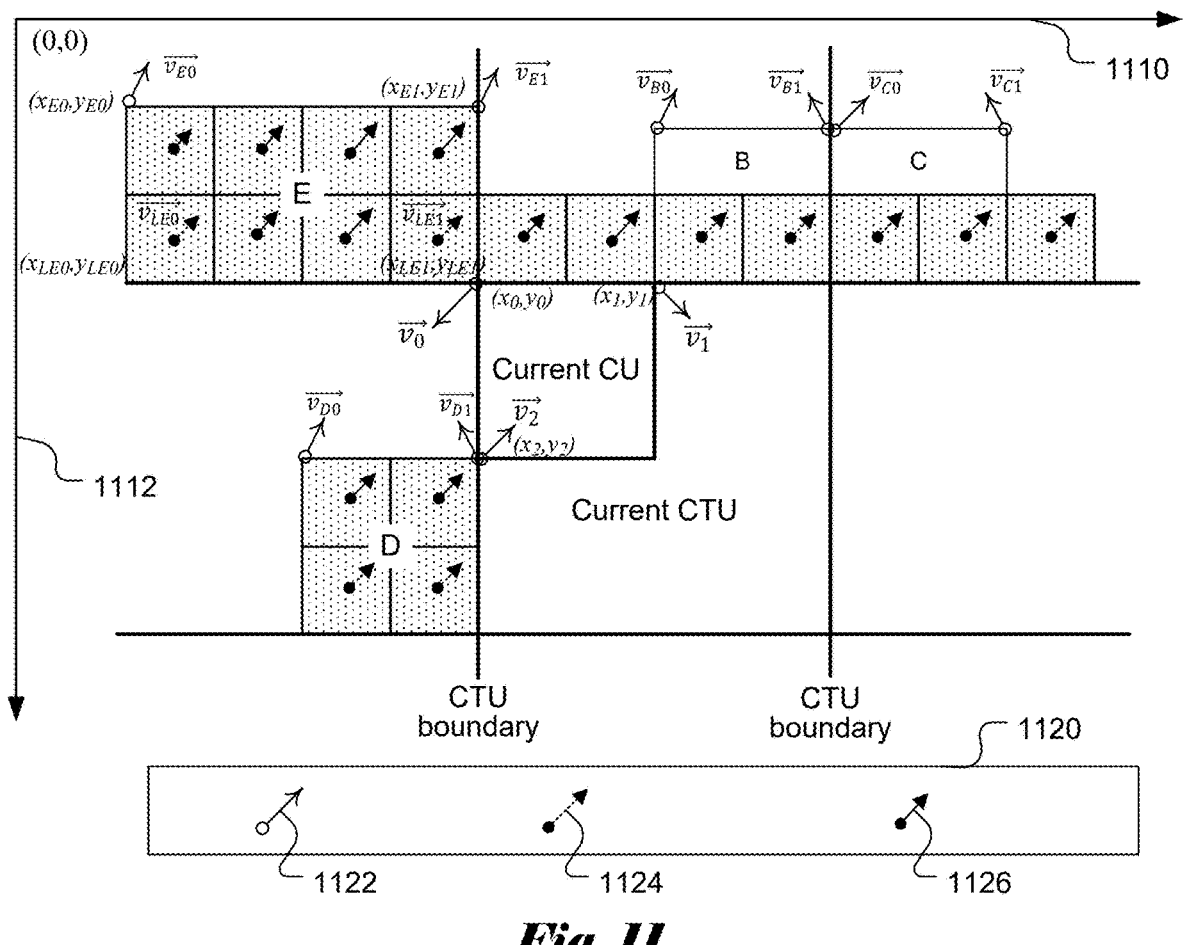
FIG. 11 illustrates an example of affine motion information storage for motion information inheritance.
Figure 15:
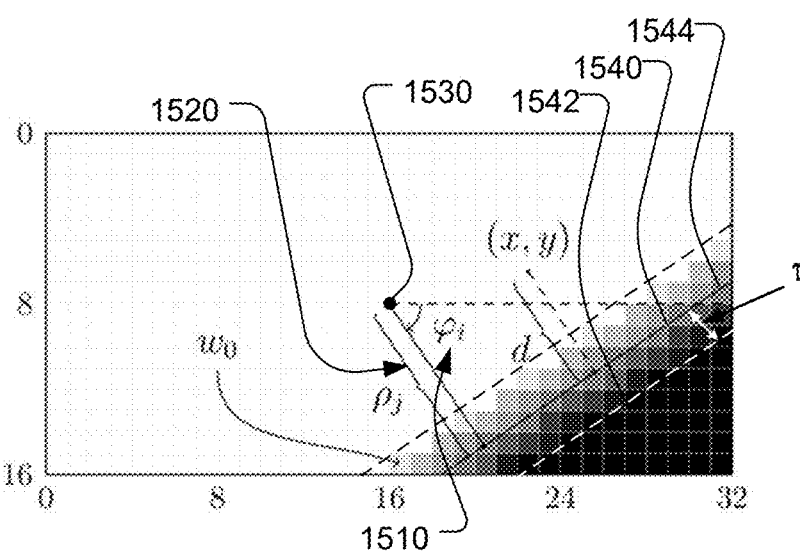
FIG. 15 illustrates an example of bending weight $\omega_0$ using the geometric partitioning mode.
Figure 16:
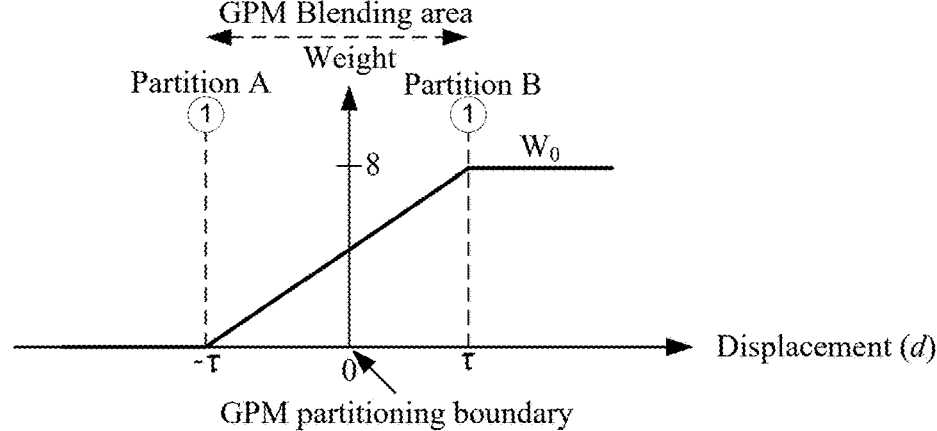
FIG. 16 illustrates an example of GPM blending process according to a discrete ramp function for the blending area around the boundary.
Figure 17:
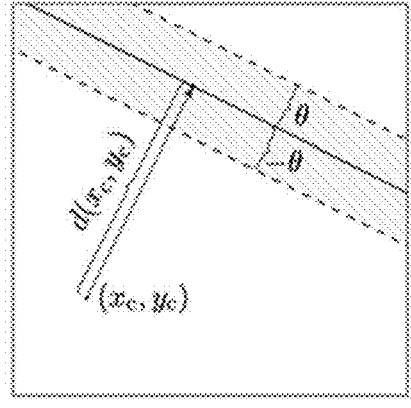
FIG. 17 illustrates an example of GPM blending process used for GPM blending in ECM 4.0.
Figure 18:
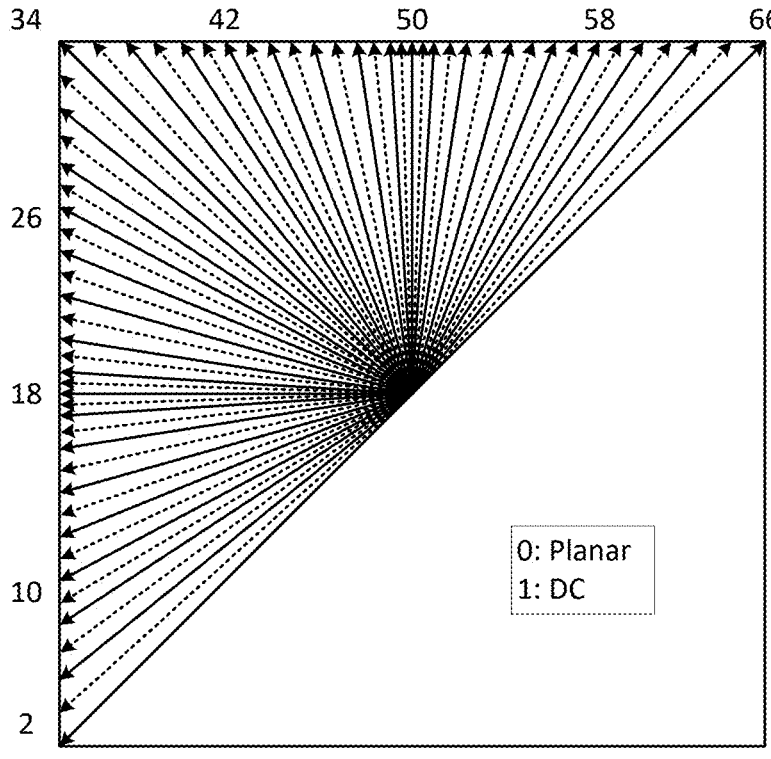
FIG. 18 shows the intra prediction modes as adopted by the VVC video coding standard.
Figure 19A:
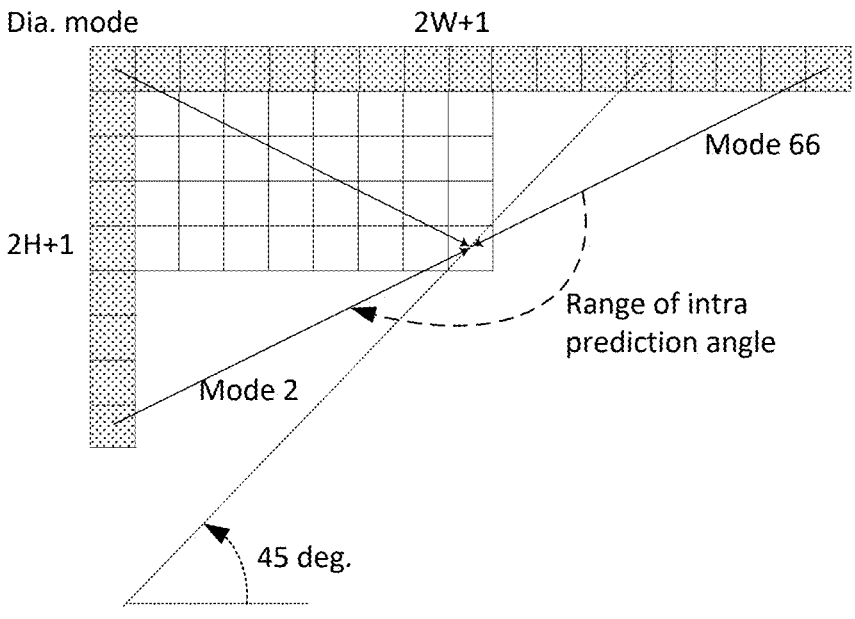
FIGS. 19A-B illustrate examples of wide-angle intra prediction for a block with width larger than height (FIG. 19A) and a block with height larger than width (FIG. 19B).
Figure 19B:
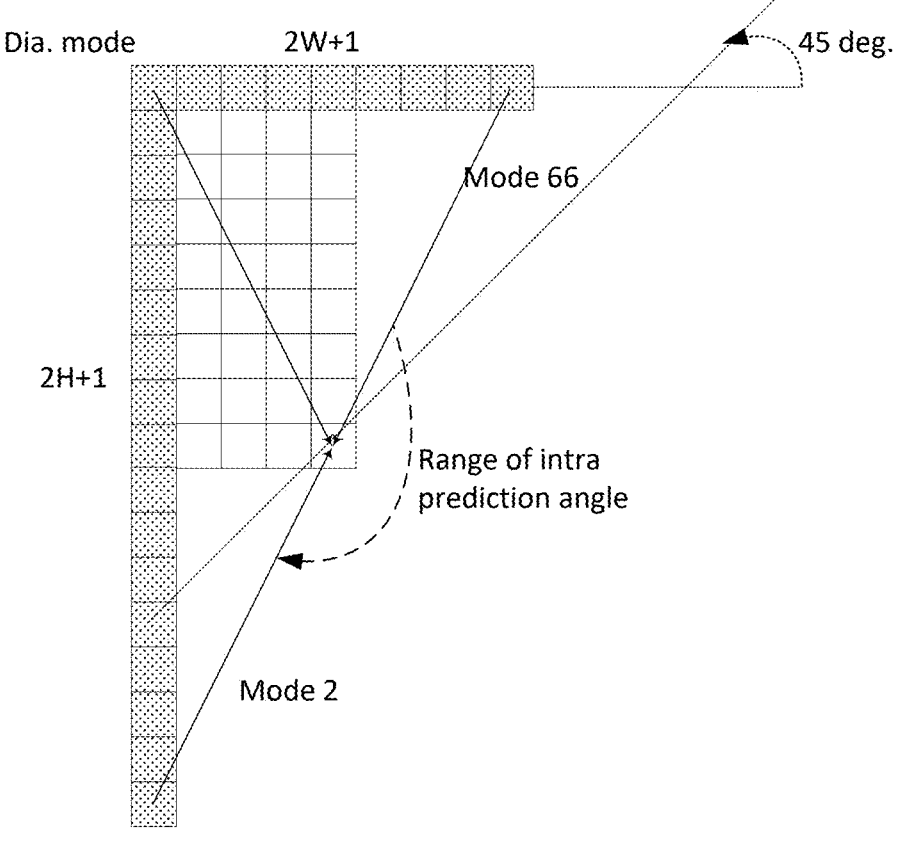
Figure 20A:
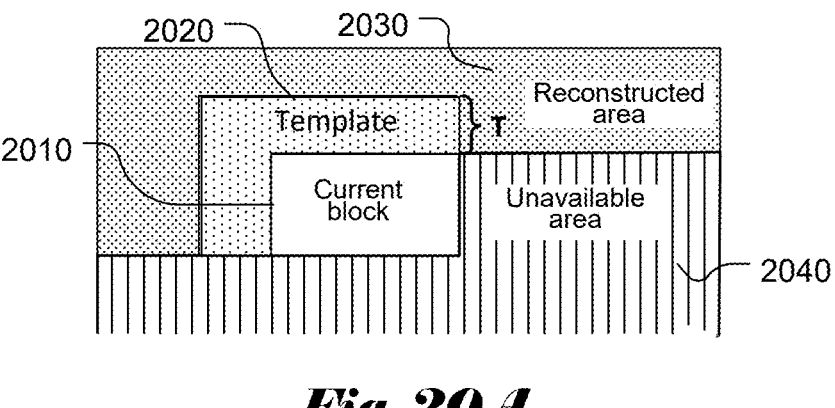
FIG. 20A illustrates an example of selected template for a current block, where the template comprises T lines above the current block and T columns to the left of the current block.
Figure 20B:
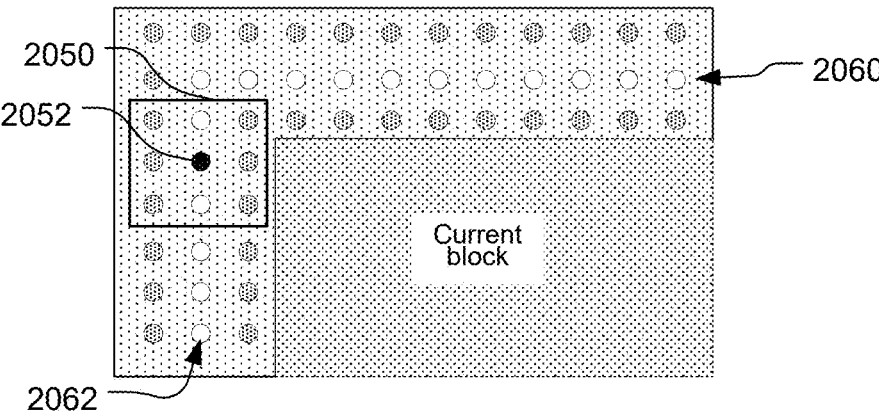
FIG. 20B illustrates an example for T=3 and the HoGs (Histogram of Gradient) are calculated for pixels in the middle line and pixels in the middle column.
Figure 20C:
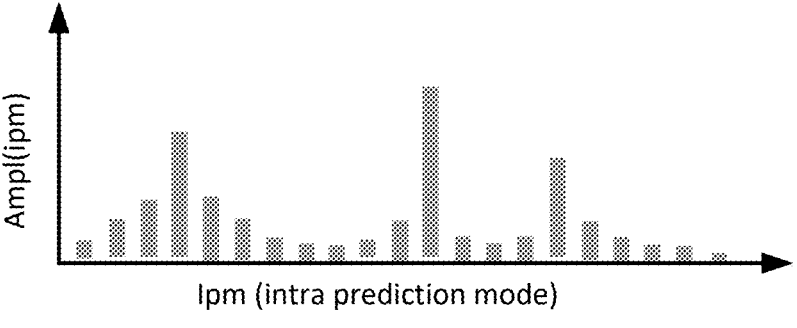
FIG. 20C illustrates an example of the amplitudes (ampl) for the angular intra prediction modes.
Figure 21:
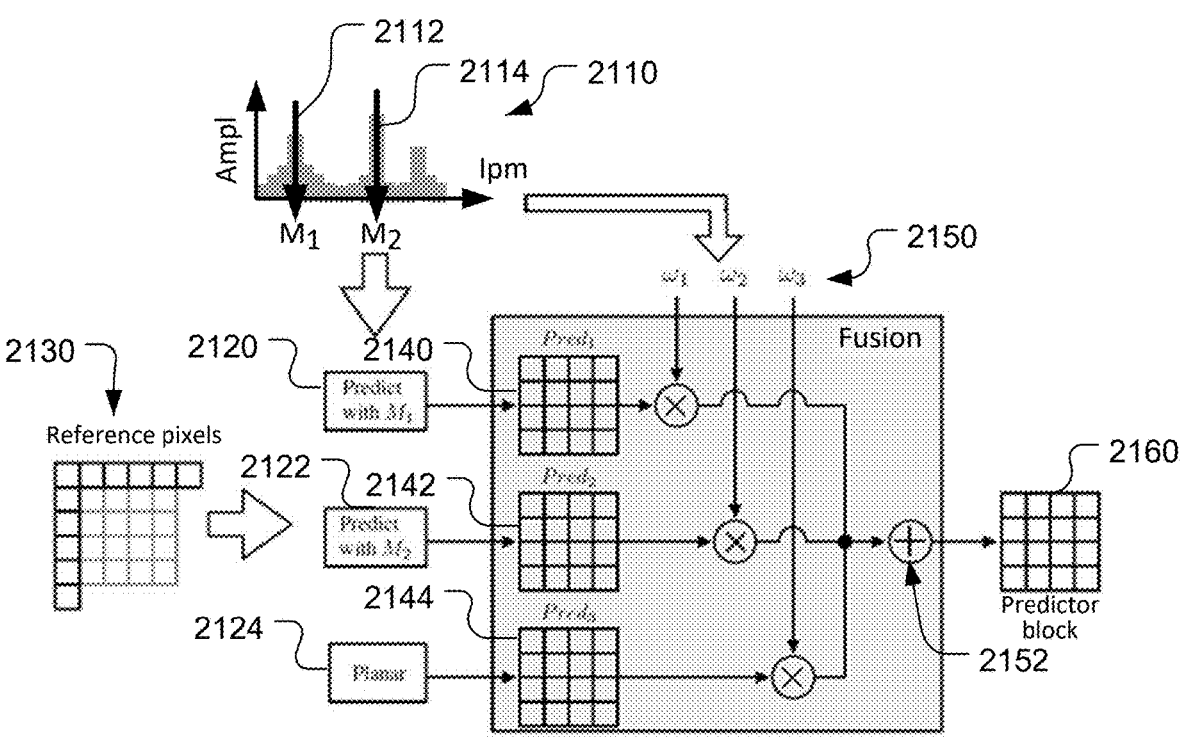
FIG. 21 illustrates an example of the blending process, where two angular intra modes (M1 and M2) are selected according to the indices with two tallest bars of histogram bars.
Figure 22:
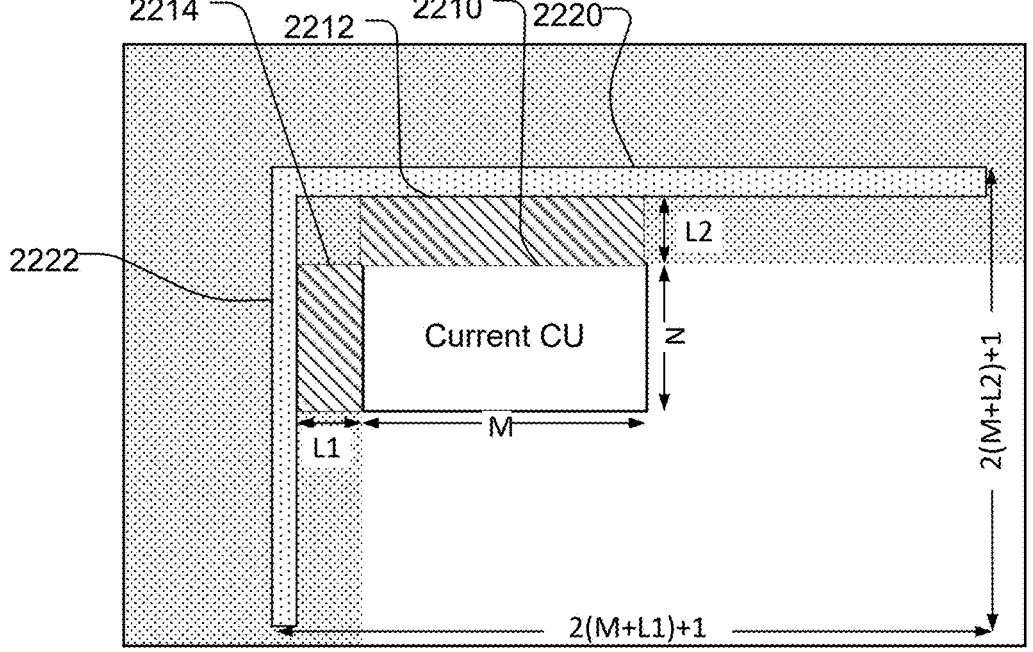
FIG. 22 illustrates an example of template-based intra mode derivation (TIMD) mode, where TIMD implicitly derives the intra prediction mode of a CU using a neighbouring template at both the encoder and decoder.
Figure 23A:
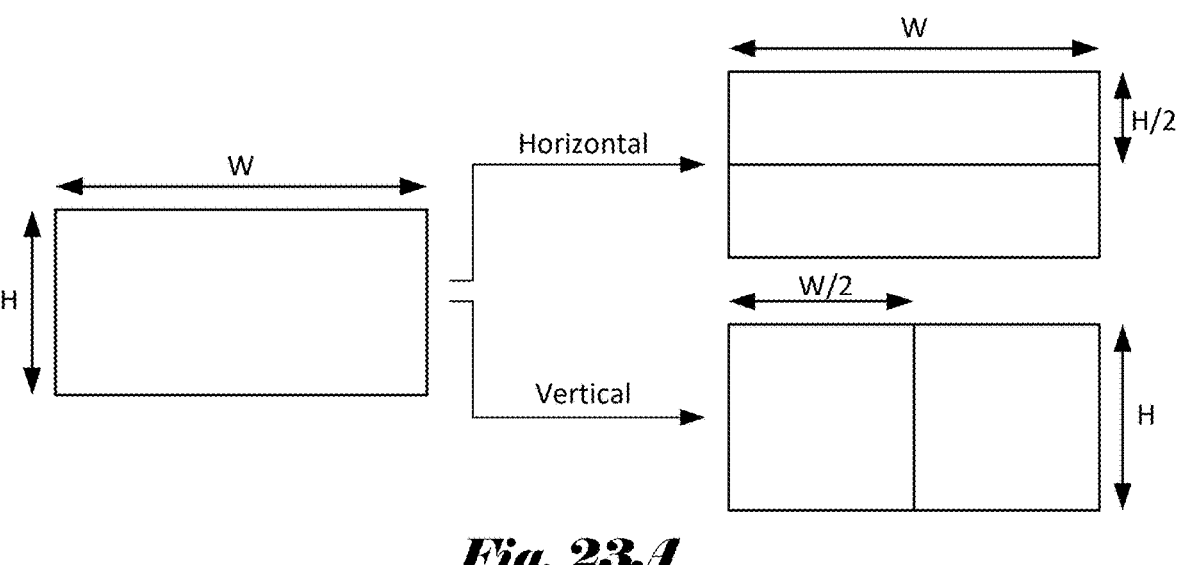
FIG. 23A illustrates an example of Intra Sub-Partition (ISP), where a block is partitioned into two subblocks horizontally or vertically.
Figure 23B:
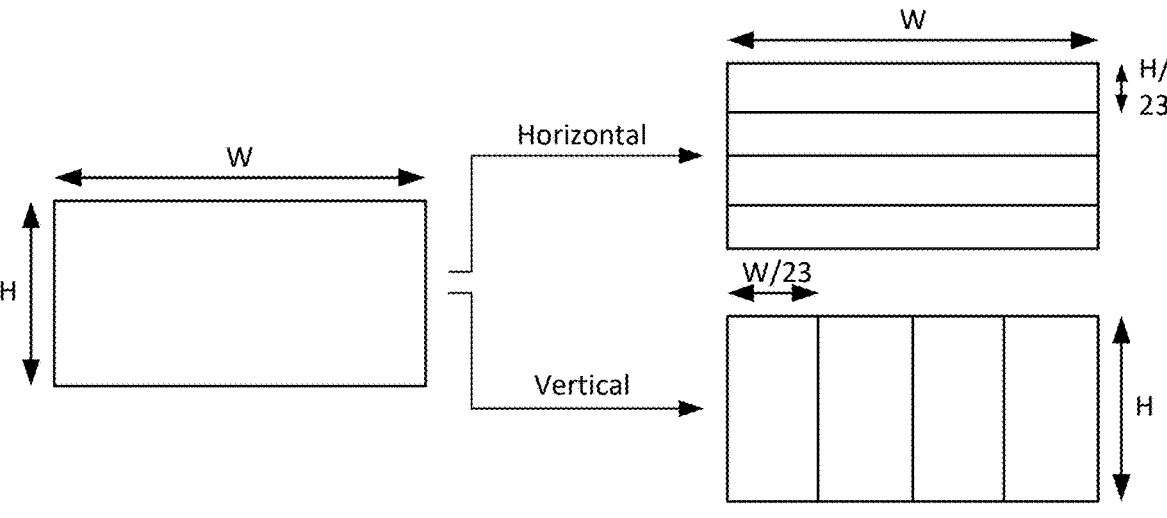
FIG. 23B illustrates an example of Intra Sub-Partition (ISP), where a block is partitioned into four subblocks horizontally or vertically.

Any of the foregoing proposed adaptive predictor blending methods for coding tool using blended predictors can be implemented in encoders and/or decoders. For example, the blended predictors correspond to two intra predictors or a mix of intra and inter predictors, which can be implemented in an inter/intra/prediction module of an encoder, and/or an inter/intra/prediction module of a decoder. For example, in the encoder side, the required processing can be implemented as part of the Inter-Pred. unit 112 and/or Intra Pred. unit 110 as shown in FIG. 1A. However, the encoder may also use additional processing unit to implement the required processing. For the decoder side, the required processing can be implemented as part of the MC unit 152 and/or or Intra Pred. 150 as shown in FIG. 1B. However, the decoder may also use additional processing unit to implement the required processing. Alternatively, any of the proposed methods can be implemented as a circuit coupled to the inter/intra/prediction module of the encoder and/or the inter/intra/prediction module of the decoder, so as to provide the information needed by the inter/intra/prediction module. While the Inter-Pred. 112 and Intra Pred. 110 in the encoder side and MC 152 and Intra Pred. 150 in the decoder side are shown as individual processing units, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)).

Figure 29:
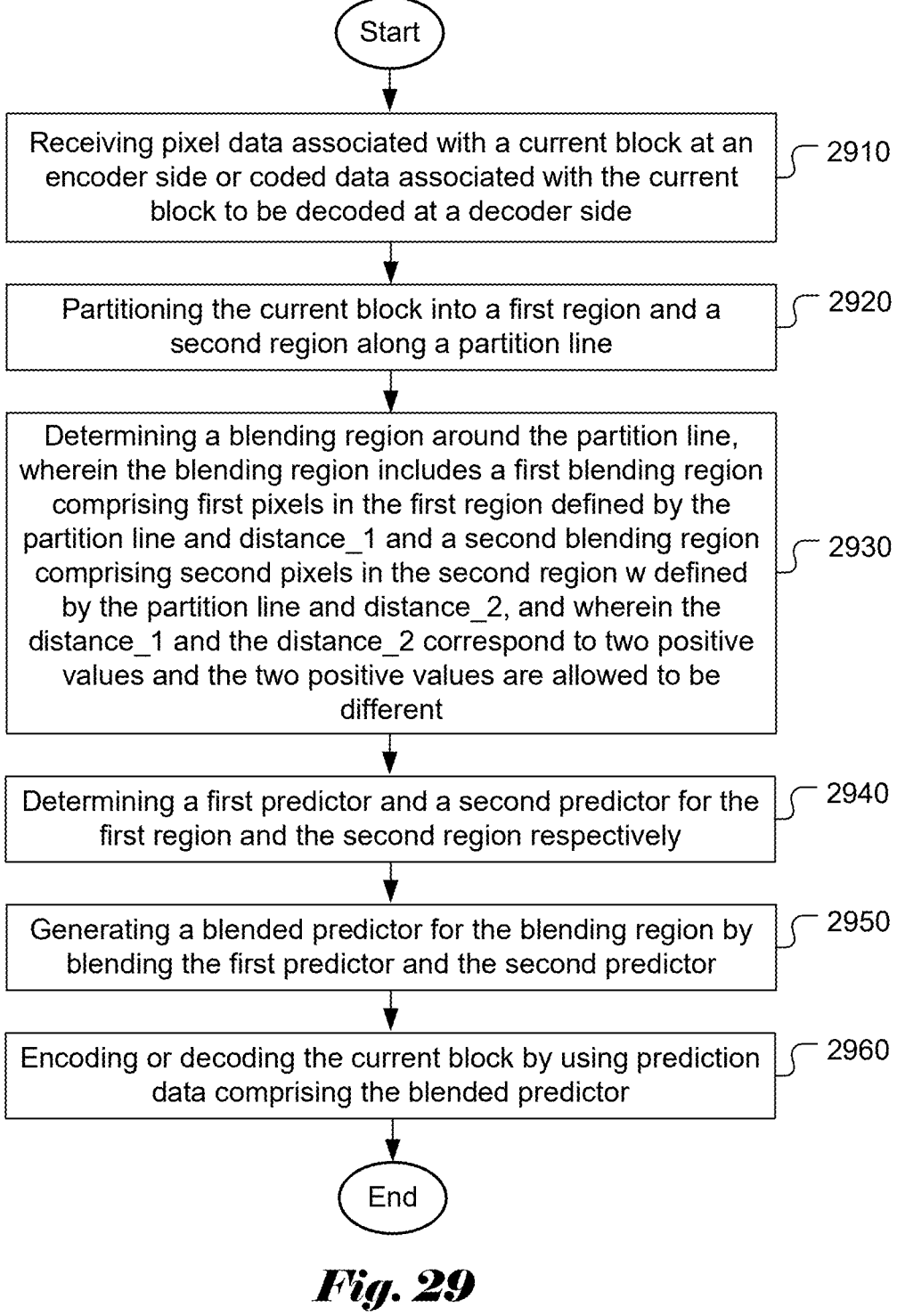
FIG. 29 illustrates a flowchart of an exemplary video coding system that utilizes blended predictors according to an embodiment of the present invention.

FIG. 29 illustrates a flowchart of an exemplary video coding system that utilizes adaptive blended predictors according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, data associated with a current block at an encoder side or coded data associated with the current block to be decoded at a decoder side are received in step 2910. The current block is partitioned into a first region and a second region along a partition line in step 2920. A blending region around the partition line is determined in step 2930, wherein the blending region includes a first blending region comprising first pixels in the first region defined by the partition line and distance_1 and a second blending region comprising second pixels in the second region defined by the partition line and distance_2, and wherein the distance_1 and the distance_2 correspond to two non-negative values and two non-negative values are allowed to be different. A first predictor and a second predictor are determined for the first region and the second region respectively in step 2940. A blended predictor for the blending region is generated by blending the first predictor and the second predictor in step 2950. The current block is encoded or decoded by using prediction data comprising the blended predictor in step 2960.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for colour pictures, the method comprising:

receiving pixel data associated with a current block at an encoder side or coded data associated with the current block to be decoded at a decoder side;

partitioning the current block into a first region and a second region along a partition line;

determining a blending region around the partition line, wherein the blending region includes a first blending region comprising first pixels in the first region defined by the partition line and distance_1 and a second blending region comprising second pixels in the second region defined by the partition line and distance_2, and wherein the distance_1 and the distance_2 correspond to two positive values and the two positive values are allowed to be different, wherein the difference in values is based on a respective size difference of the first and second regions;

determining a first predictor and a second predictor for the first region and the second region respectively;

generating a blended predictor for the blending region by blending the first predictor and the second predictor; and encoding or decoding the current block by using prediction data comprising the blended predictor.

2. The method of claim 1, wherein the blended predictor is generated as a weighted sum of the first predictor and the second predictor.

3. The method of claim 1, wherein a candidate set for a size of the blending region is pre-defined, wherein the size of the blending region is related to the distance_1 and the distance_2.

4. The method of claim 3, wherein an explicit index is signalled or parsed to indicate the size of the blending region selected from the candidate set for the current block.

5. The method of claim 4, wherein a syntax related to the explicit index is signalled at a block-level, SPS (Sequence Parameter Set)-level, PPS (Picture Parameter Set)-level, APS (Adaptation Parameter Set)-level, PH (Picture Header)-level, SH (Slice header)-level or a combination thereof.

6. The method of claim 4, wherein the candidate set is reordered according to a cost associated with each member of the candidate set.

7. The method of claim 6, wherein the cost corresponds to a template matching cost measured based on a template and an extended blending region, and wherein the template comprises a left neighbouring area of the current block, a top neighbouring area of the current block, or both.

8. The method of claim 3, wherein the size of the blending region for the current block is determined implicitly according to a target member of the candidate set achieving a smallest template matching cost, and wherein template matching cost is measured based on a template of the current block and an extended blending region.

9. The method of claim 1, wherein a target candidate of (the distance_1, the distance_2) is selected from a candidate set for the current block according to a block size of the current block.

10. The method of claim 9, wherein the block size corresponds to block width, block height, or block area.

11. The method of claim 9, wherein the candidate set comprises data pairs corresponding to combinations of the distance_1 and the distance_2, and wherein each of the distance_1 and the distance_2 is selected from a value group including 0, 1, 2, 4 and 8.

12. The method of claim 11, wherein if either block width or block height is smaller than a pre-defined threshold, only smaller values of the value group are used to form the data pairs for the candidate set.

13. The method of claim 11, wherein if the first region is smaller than the second region, the distance_1 is set to a smaller value than the distance_2.

14. The method of claim 11, wherein if the first region is larger than the second region, the distance_1 is set to a larger value than the distance_2.

15. The method of claim 1, wherein the first predictor and/or the second predictor correspond to hypotheses of prediction comprising one or more first predictions from motion with a pre-defined direction or bi-direction, one or more second predictions generated from a motion candidate, one or more third predictions from an intra candidate, one or more motion candidates, or a combination thereof.

16. An apparatus for video coding, the apparatus comprising one or more electronics or processors arranged to:

receive pixel data associated with a current block at an encoder side or coded data associated with the current block to be decoded at a decoder side;

partition the current block into a first region and a second region along a partition line;

determine a blending region around the partition line, wherein the blending region includes a first blending region comprising first pixels in the first region defined by the partition line and distance_1 and a second blending region comprising second pixels in the second region defined by the partition line and distance_2, and wherein the distance_1 and the distance_2 correspond to two positive values and the two positive values are allowed to be different, wherein the difference in values is based on a respective size difference of the first and second regions;

determine a first predictor and a second predictor for the first region and the second region respectively;

generate a blended predictor for the blending region by blending the first predictor and the second predictor; and encode or decode the current block by using prediction data comprising the blended predictor.

* * * * *